(12) United States Patent
Bhargava et al.

(10) Patent No.: US 12,776,951 B2
(45) **Date of Patent: *Oct. 27, 2026**

(54) INCREMENTAL NETWORK INTENT PROVISIONING

(71) Applicant: Cisco Technology, Inc., San Jose, CA (US)

(72) Inventors: Ankur Bhargava, Pleasanton, CA (US); Anand Krishnamurthy, San Jose, CA (US); Kenneth William Chambers, Raleigh, NC (US); Gavin Llewellyn Camp, Glasgow (GB)

(73) Assignee: Cisco Technology, Inc., CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 19/025,745

(22) Filed: Jan. 16, 2025

(65) Prior Publication Data

US 2025/0158882 A1 May 15, 2025

Related U.S. Application Data

(63) Continuation of application No. 18/599,868, filed on Mar. 8, 2024, now Pat. No. 12,261,743, which is a (Continued)

(51) Int. Cl.
*G06F 15/16* (2006.01)
*H04L 41/08* (2022.01)
(Continued)

(52) U.S. Cl.
CPC ...... *H04L 41/0816* (2013.01); *H04L 41/0886* (2013.01); *H04L 41/12* (2013.01); *H04L 41/22* (2013.01)

(58) Field of Classification Search
CPC ............ H04L 41/0816; H04L 41/0886; H04L 41/12; H04L 41/22
See application file for complete search history.

(56) References Cited

U.S. PATENT DOCUMENTS

| | | | | |
|---|---|---|---|---|
| 6,789,128 | B1 * | 9/2004 | Harrison | H04L 67/60 707/999.203 |
| 10,374,872 | B2 * | 8/2019 | Ratkovic | H04L 67/51 |

(Continued)

OTHER PUBLICATIONS

Office Action for U.S. Appl. No. 17/574,435, mailed on Feb. 2, 2023, Ankur Bhargava, "Incremental Network Intent Provisioning", 13 pages.

(Continued)

*Primary Examiner* — Padma Mundur
(74) *Attorney, Agent, or Firm* — Lee & Hayes, P.C.

(57) ABSTRACT

Techniques for provisioning a network may include, with a network controller, identifying a first network intent of a computing network based at least in part on an execution of a user interface (UI) or API layer at a client device, and identifying a modification of an object within the first network intent within the UI or API layer at the client device as the first network intent is being modified. The modification defines a delta between the first network intent and a second network intent. The method may further include, with a provisioning service executed by the network controller, receiving the delta from the client device, and provisioning a computing device within the computing network based at least in part on the delta. The method further includes automatically modifying the object based on the received delta, including a further modification of the second network intent.

20 Claims, 7 Drawing Sheets

Related U.S. Application Data continuation of application No. 17/574,435, filed on Jan. 12, 2022, now Pat. No. 11,936,523.

(51) Int. Cl.

| | |
|---|---|
| ***H04L 41/0816*** | (2022.01) |
| ***H04L 41/12*** | (2022.01) |
| ***H04L 41/22*** | (2022.01) |

(56) References Cited

U.S. PATENT DOCUMENTS

| | | | | |
|---|---|---|---|---|
| 10,862,749 | B1 | 12/2020 | Kiyak et al. | |
| 10,992,543 | B1 * | 4/2021 | Rachamadugu .... | H04L 41/0869 |
| 2009/0046656 | A1 * | 2/2009 | Kitazoe ............. | H04W 36/0058 370/331 |
| 2018/0373542 | A1 | 12/2018 | Karlsson et al. | |
| 2020/0204454 | A1 | 6/2020 | Sharma et al. | |
| 2020/0274772 | A1 * | 8/2020 | A ........................ | H04L 41/0813 |
| 2021/0028980 | A1 * | 1/2021 | R ........................ | H04L 41/5009 |
| 2021/0075689 | A1 | 3/2021 | Ramanathan et al. | |
| 2023/0224214 | A1 | 7/2023 | Bhargava | |
| 2025/0039043 | A1 | 1/2025 | Bhargava | |

OTHER PUBLICATIONS

Office Action for U.S. Appl. No. 17/574,435, mailed on Jul. 19, 2023, Ankur Bhargava, “Incremental Network Intent Provisioning”, 14 pages.

* cited by examiner

INCREMENTAL NETWORK INTENT PROVISIONING

CROSS REFERENCE TO RELATED APPLICATIONS

This application is a continuation of and claims priority to U.S. patent application Ser. No. 18/599,868, filed Mar. 8, 2024, which is a continuation of and claims priority to U.S. patent application Ser. No. 17/574,435, filed Jan. 12, 2022, the entire contents of which are incorporated herein by reference.

TECHNICAL FIELD

The present disclosure relates generally to computer networking. More particularly, the present disclosure relates to systems and methods for the efficient computation of model changes within a network intent.

BACKGROUND

Computer networks are ubiquitous and serve to allow for data to be transmitted from a first computing device within the network to a second computing device communicatively coupled to the first computing device. These networks may include between a few computing devices to potentially hundreds of thousands of computing devices. Network provisioning is the process of setting up a network so that authorized users, host computing devices, switches, routers, servers, and other network computing devices may access the network and communicate with one another. Network provisioning may include creating connectivity between the computing devices within the network and configuring services among those devices such as security, monitoring, traffic copy, and QoS.

A network intent provides a model of the computer network, encompassing the definition of the network and how it is interconnected to provide connectivity and services. An IBN controller takes the network intent as input and through network provisioning realizes this intent on the network. Therefore, to effect changes on the network the definition of network intent first needs to be altered. In many provisioning operations, only a small part of the network intent requires modification wherein minimal changes are made to a number of computing devices within the network. Some of the network intent models used to provision a network may be very large resulting in larger provisioning times. Indeed, in general as the size of the network grows the size of the associated provisioning intent also grows increasing the time of deployment. Thus, for very large networks including tens of thousands of computing devices, provisioning even minimal changes in a relatively small number of computing devices within the computing network may take considerable time and computing resources to accomplish since a comparison between all the attributes and associations of the nodes or computing devices within the existing network and the user's or administrator's intended provisioning (e.g., network intent) of the network must be performed.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
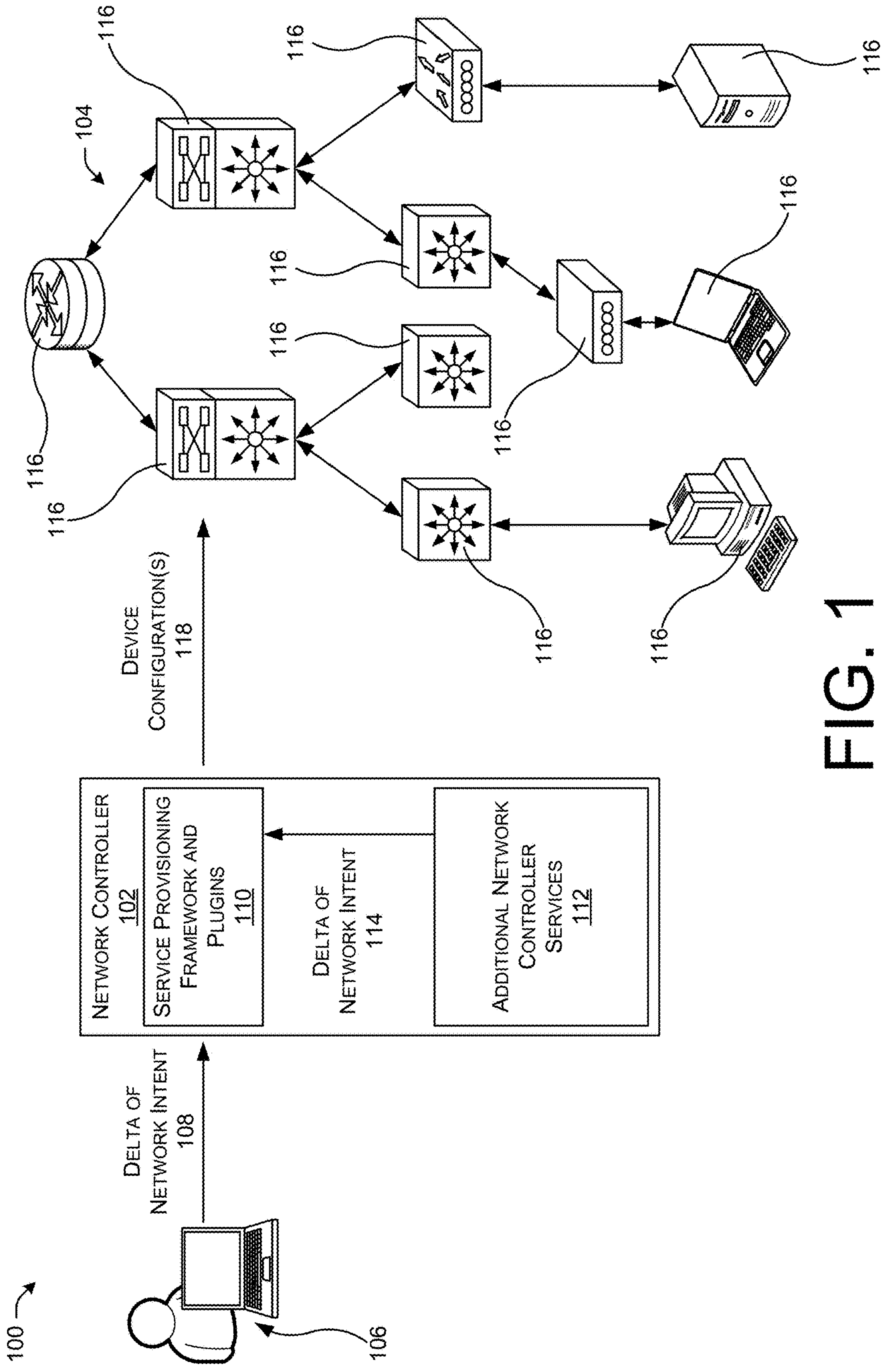
FIG. 1 illustrates a system-architecture diagram of an intent-based networking (IBN) system including a network controller for provisioning a network, according to an example of the principles described herein.

In the realm of network provisioning, intent-based networking (IBN) processes and systems may assist a user in provisioning elements within a computing network. IBN systems aim to apply a deeper level of intelligence and intended state insights to networking by using policy-based automation to deliver services to the computing network based on business priority and to simplify device deployment within the computing network. These insights replace the manual processes of configuring networks and reacting to network issues. In IBN model network administrators may send a request to tell the network what outcome they want (e.g., a network intent) instead of needing to code and execute individual tasks manually via, for example, a command line interface (CLI).

IBN may assist a user to plan, design, implement, and/or operate networks that can improve network availability and agility by reducing time and user interaction during a network provisioning operation. An IBN system may include, at a high level of description, validation and translation, automated deployment, awareness, and knowledge of a state of a computing network, and assurance and dynamic optimization and remediation.

As to the validation and translation, an IBN system may take a higher-level business intent as input from users or administrators and convert that higher-level business intent to the necessary network configuration. This higher-level business intent may be consumed by the IBN system via, for example, a user-friendly user interface (UI) presented at a client device communicatively coupled to a network controller of the IBN. The IBN system may then generate and validate the resulting design and configuration for correctness. In one example, the higher-level business intent could be modelled using the notion of a customer facing service (CFS) which would require transformation to a device-based resource-facing service (RFS) before being pushed to the network. A CFS model defines the service intent from the customers perspective, and the RFS model represents how the controller decides to implement that intent on the network. The RFS that satisfies the CFS intent could potentially be implemented in many ways depending on the available devices/resources in the network and their capabilities. A high-level definition of a required connectivity in a network is an example of a CFS. A CFS may define the service intent from the perspective of a user or administrator. A resource-facing service (RFS) may be indirectly part of a product but are generally less visible to the customer. The RFS exists to support one or more CFSs. The RFS may define how a controller decides to implement the intent on the network such that the implementation will satisfy the intent. However, implementation of the intent on the network may be performed in a number of different ways depending on available computing devices and/or resources in the network and their respective capabilities. A VPN could be employed to provide this network connectivity and may utilize border gateway protocol (BGP) to support the VPN. The customer does not purchase the BGP, and, in most situations, is not required to be aware that BGP is running. Thus, BGP is an example of an RFS. An RFS model represents the actual implementation of a CFS and contains the configuration for each network device. An RFS model may be stored or cached in a database (inventory datastore). This cache requires re-synchronization with the state of the network devices should the controller go offline, or if the state of the network is changed out of band from the management system.

On receipt of the CFS the system creates a lock for the CFS so that subsequent provisioning operations are not executed until the current changes are validated and persisted. A CFS validator from application plugins may be utilized to validate the service provisioning request and ensure that all prerequisites are met. For example, during device provisioning, validation ensures that the device exists in the inventory (e.g., available within the computing network). During QoS policy provisioning, there is validation to ensure that different business relevance is not specified for the same network application.

Further, in one example, the CFS validator may calculate and update/augment the intent graph as a second instance in which the intent is modified and may be considered as a second category of modification. For example, when NetFlow settings are provisioned, the name of flow exporter may be implicitly set by the backend if a user has not provided the name in the input intent. In one example when an interface is provisioned, the backend may automatically allocate an IP address from an IP address management (IPAM) system and update the intent.

Once the CFS intent is validated, the CFS is persisted and then translated into device-specific RFS. In one example, A CFS translator from application plugins which have domain specific logic may be utilized to translate the CFS into RFS object operations.

The IBN system may also handle assurance and dynamic optimization and/or remediation within the computing network. The IBN system may continuously validate, (e.g., in one example, in real time) that the original business intent of the system is being met and may take corrective actions when the desired intent is not met. For example, the IBN system may block traffic, modify network capacity, notify a user or administrator, perform other validation processes, and combinations thereof. For example, when a new line card is added, a controller may implicitly deploy a QoS policy on the interfaces in the newly added line card.

Along with translation, the IBN system may also include deployment processes where the intended configuration is deployed to the target devices within the network. Deploying the RFS determined in the above processes first requires further transformation from the RFS model to device-specific configurations that will be pushed to the target device(s).

As to automated implementation, the IBN system may configure the appropriate network changes across existing network infrastructure through automated implementation processes. In one example, the implementation may be performed via automated network provisioning and/or network orchestration.

With the above understanding, it is noted that a current or first network intent may be modified by a user or administrator in order to effect a change to one or more computing devices within the underlying network. In order to do so, the network controller may perform an end-to-end comparison of the first network intent and a second network intent created via the modification at the CFS. The first network intent and second network intent include large data sets that define the attributes, associations, names, and types of objects within the network. The objects may include computing devices (such as, for example, servers, routers, switches, etc.) and any associated physical or logical resources (such as virtual networks, QoS policies, access policies, interfaces) residing on those computing devices. Comparison of the relatively large data sets of the first network intent and second network intent may consume large amounts of computing resources including data processing resources and bandwidth as well as data storage resources where the data sets defining the first network intent and second network intent may be stored persistently and/or non-persistently. Further, transmission of these large data sets defining the first network intent and second network intent may require large payload sizes which in turn require a large number of buffers to send and receive the data sets between, for example, a client device and the network controller during the provisioning inter-process communications.

The present disclosure provides for a significant reduction in computing and data transmission resources by foregoing the process of an end-to-end comparison of the first network intent and a second network intent created via the modification at the CFS. Instead, any modification of at least one object within the first network intent will be automatically detected and recorded during the modification process. The modification computes and records a delta between the first network intent and a second network intent. This delta is significantly smaller in size relative to both or either the first network intent and a second network intent and, therefore, may create a significantly smaller impact on the computing and data transmission resources of the IBN system. The delta may be used instead of the complete second network intent as the basis by which the network controller may modify the RFS device model used to, in turn, effect changes within the network being provisioned.

Overview

Examples described herein provide a method of provisioning a network utilizing an IBN network controller. A client device may identify the network intent for the network. Any modification of at least one object within the network intent made at either the client device or during an automatic calculation within the controller itself may be recorded as the network intent is being modified. The modification defining a delta between the initial state of the network intent and the final state of the network intent. The method also includes sending and receiving the intent as a delta payload instead of transporting the entire intent payload. This significantly reduces time and computing resources required to configure or provision the network as described herein.

The method may further include automatically modifying the at least one object based on the received delta. Automatically modifying the at least one object may include a further modification of the second network intent.

The model may be defined using a set of relational model entities, each entity containing a set of properties and optionally relationships to other entities. The delta may be defined by a change log (e.g., ChangeLogList) identifying a type of change log item (e.g., ChangeLogItem), the change log item storing any modification to the model entity within the entity itself. The change log item may include all the required information to replay and/or recreate the change to the intent at the controller end. For single properties and 1-1 associations this may include changes to the property and/or association, for properties that contain collections or n-n associations this would include the position of the change in the collection.

The ChangeLogItem includes all the required information to replay/recreate the change to the intent model. For single properties and one-to-one associations this would include changes to the property and/or association, for properties that contain collections or n-n associations this would include the position of the change in the collection. To record this information the change log item may include a name, a property type, and a value, and for associations the type includes at least one method (e.g., at least one of SET, ADD, REMOVE, ADD_AT_INDEX, REMOVE_AT_INDEX, and combinations thereof).

The method may include defining a mechanism where any changes (i.e., deltas) to the model entities are automatically captured within the changelog. This is achieved by adding logic to the model entity to record the deltas within the set of change logs as the model entities are altered.

The method further includes defining how to serialize the changelog into a transportable payload such that any changes to the model can be replayed and/or recreated at the receiving end, reconstructing any changes to the model without requiring the transportation of the entire model.

Examples described herein also provide a non-transitory computer-readable medium storing instructions that, when executed, causes a processor to perform operations, including, with a network controller, identifying a modification of at least one object within a first network intent of a computing network within a client device as the first network intent is being modified. The modification defines a delta between the first network intent and a second network intent. The operations may further include receiving the delta as a payload from the client device, and provisioning at least one computing device within the computing network based at least in part on the delta.

The operations may further include automatically modifying the at least one object based on the received delta. Automatically modifying at least one object includes a further modification of the second network intent. The operations include adding logic to the change log for every instance of attribute or association. The operations further include translating the second network intent into a device model based at least in part on the delta.

Examples described herein also provide a network controller including a processor and a non-transitory computer-readable media storing instructions that, when executed by the processor, causes the processor to perform operations including identifying a modification of at least one object within a first network intent of a computing network as the first network intent is being modified, the modification defining a delta between the first network intent and a second network intent. The operations may also include receiving the delta as a payload from a client device, and provisioning at least one computing device within the computing network based at least in part on the delta.

The operations further include adding logic to the change log for every instance of attribute or association. The modification includes at least one of modification of at least one object within a customer facing service (CFS) model graph, modification of at least one object due to an automatic calculation in a backend, or combinations thereof. The modifications comprising at least one of a number of attributes and a number of associations between computing devices within the computing network. The operations further include translating the second network intent into a device model based at least in part on the delta.

Provisioning at least one computing device within the computing network based at least in part on the delta includes constructing a device RFS model. Provisioning at least one computing device within the computing network based at least in part on the delta includes reading a change log from a network intent graph. Based at least in part on the change log the operations may include invoking a specific translation method associated with the change log including generating at least one resource-facing service (RFS) object operation and ignoring any remaining translations that do not change at least one RFS object operation.

Additionally, the techniques described in this disclosure may be performed as a method and/or by a system having non-transitory computer-readable media storing computer-executable instructions that, when executed by one or more processors, performs the techniques described above.

Example Embodiments

Turning now to the figures, FIG. 1 illustrates a system-architecture diagram of an intent-based networking (IBN) system 100 including a network controller 102 for provisioning a network 104, according to an example of the principles described herein. In one example, the IBN system 100 may include a network controller 102 that may be implemented on any type of computing network including, for example, a local area network (LAN), a home area network (HAN), a storage area network (SAN), a campus area network (CAN), a metropolitan area network (MAN), a wide area network (WAN), an enterprise private network, and virtual private network (VPN), an internet area network (IAN) (e.g., a cloud computing network), an internet (including the Internet), a service provider network, and a data center network, among a myriad of other types of computing networks, and combinations thereof. Further, the present systems and methods may be applied among a plurality of networks including different types of networks. In one example, the network controller 102 may include or comprise of the Cisco DNA Center network controller and management dashboard developed and distributed by Cisco Systems, Inc.

The network 104 may include any type of computing device such as, for example, networking devices. The computing devices within the network 104 may include, for example, servers, routers, client switches, computing devices, relays, repeaters, encoder/receiver/transmitters (ERTs), appliances, personal computers (e.g., desktop computers, laptop computers, etc.), mobile devices (e.g., smartphones, tablets, personal digital assistants (PDAs), electronic reader devices, etc.), wearable computers (e.g., smart watches, optical head-mounted displays (OHMDs), etc.), access points, and gateway computing devices, among a myriad of other network computing devices, and combinations thereof. An administrator may design the network 104 to include a number of the computing devices and may define, identify, and store data about the computing devices of the network 104 in a data storage device within the network 104 or by a third party device such as the network controller 102 and/or a client device 106.

The network controller 102 may enable services within the network 104 through a number of provisioning processes. For example, the network controller 102 may enable network settings provisioning where the network controller 102 provisions network servers including, for example, authentication, authorization, and accounting (AAA) servers, dynamic host configuration protocol (DHCP) servers, domain name system (DNS) servers, Network Time Protocol (NTP) servers, NetFlow exporters, other servers, and combinations thereof. The network controller 102 may also provision wireless settings such as service set identifiers (SSIDs) and wireless interfaces between the computing devices within the network 104. Further, the network controller 102 may enable software-defined access (SDA) provisioning where the network controller 102 provisions automation and assurance processes of all fabric configurations within the network 104, provisions management and group-based policies, and provisions orchestration of access to the various types of networks such as a LAN, a wireless LAN, a WAN, etc. The network controller 102 may also provision quality of service (QoS) policies, access policies, copy policies, other types of policies, and combinations thereof.

The network controller 102 may configure the computing devices within the network 104 so that the service functionalities described above may be enabled. Thus, in order to achieve the intent and provision state defined by the administrator, the computing devices within the network 104 are configured. In examples not enabled in the present systems and methods, a command line interface (CLI) may be utilized by an administrator to directly configure the network devices based on the network intents. The use of a CLI is extremely inconvenient, cumbersome, and time consuming since commands must be sent to individual computing devices within the network 104, the administrator must know the full details of the intent that is to be implemented, and special tools must be used to deploy the intent to the computing devices.

Thus, the network controller 102 and/or the client device 106 may, instead, utilize an IBN system to provide the administrator with the ability to define networking intents at a relatively higher level of abstraction that is user-friendly and intuitive. The IBN system takes an intent defined using a CFS model and assists the administrator by converting the network intent into RFS model objects, and, in later processing, deployment of the configurations defined by the RFS model objects. For example, in an instance where the administrator desires to prioritize a first application over other applications executed on one or more of the computing devices within the network 104. Instead of the administrator defining TCP/UDP ports, the UI may present a number of QoS policies to the administrator including, for example, a list of business-relevant applications, a list of default applications, and a list of business-irrelevant applications among which the administrator may select prioritizations. The network controller 102 of the IBN system 100 may then calculate the configurations based on the selection made by the administrator and deploy that configuration to all relevant computing devices within the network 104 and within the scope of the new policy. In this manner, an administrator may conceptually define what the network intent is, and the network controller 102 determines which computing devices within the network 104 the configuration should be pushed to and how to push the configuration.

The network controller 102 may include a number of applications and services to assist in the receipt and provisioning of the network intent from the administrator at the client device 106 or the network controller 102 itself. For example, the network controller may include a service to convert the CFS model to RFS using a set of plugins included in the service provisioning framework and plugins 110. This service may include any framework used to provision various network services such as, for example, the SDA, application policies, copy policies, and encrypted traffic analytics, among other network services. The service provisioning framework supports a plugin architecture based on the network service type that is provisioned. The network service types may include, for example, a QoS policy, an access policy, a copy policy, network settings, a fabric, and encrypted traffic analytics, among other network service types. The plugins have domain specific logic to validate the network intent, augment the network intent, translate the network intent to a device model, generate CLI/YANG payload from the RFS device model. The network intent may be referred to as the CFS, and the translated device model may be referred to as the RFS.

This service may also include non-domain specific components such as, for example, a service manager (e.g., a micro service), a representational state transfer (REST) controller, a network event handler, a deserialization library to convert a CFS object graph of JSON into a network intent graph and/or model, an orchestration of various steps in provisioning, a persistence of the network intent, a status tracking, and a configuration of CLI/YANG to the network devices, among other components and functions.

As will be described in more detail below, the network controller 102 may identify a first network intent of the network 104 based at least in part at the client device 106 by an administrator of the network 104. The network controller 102 may also identify a modification of at least one object within the first network intent within the client device 106 as the first network intent is being modified. The modification defines a delta between the first network intent and a second network intent. The second network intent may define the network intent the administrator is seeking to change with respect to the first network intent. The identification of the first network intent, the delta, and/or the second network intent may be performed at the client device 106, at the network controller 102, or at both. For example, initially an administrator may create a fabric and/or policy intent for a site located in California and that fabric and/or policy intent may be provisioned. In a later instance, the administrator may decide to expand the California site by adding a new device. At this point, the network controller 102 may choose to add default values to the new device updating the fabric and/or policy intent. In this example, the network controller 102 may automatically send the network intent to itself.

In one example, the administrator may access a UI provided by the network controller UI 202 as a service to the client device 106. In this example, the functionality of the network controller 102 is provided "as a Service" where the UI presented on the client device 106 is provided as a service to the client device 106 via a cloud computing service, for example. The client device 106 may include a UI and/or any system and/or script directly using an associated application program interface (API). The client device 106 may send the modifications of the network intent in a payload to the network controller 102. In this manner, the network controller 102 may automatically have access to the modifications made by the administrator in the CFS network intent to obtain the delta without performing an end-to-end comparison of a persisted copy of the first network intent to a copy of the second network intent as received from the client device 106 after the modification by the administrator.

The network controller 102 may include a provisioning service (e.g., the micro service referred to above) executed by the network controller 102 to receive, at 108, the delta as a payload from the client device 106. In one example, the calculation of the delta may, again, be performed in real-time as the network administrator makes changes at the client device 106. The provisioning service executed by the network controller 102 may also provision at least one network device 116 within the network 104 based at least in part on the delta. In examples not enabled in the present systems and methods, a network controller or similar device may process the first network intent and the second network intent via an end-to-end comparison between the two in order to find the differences between the previous network intent (e.g., the first network intent) and the new or modified network intent (e.g., the second network intent). This, end-to-end comparison of the first network intent and the second network intent may take considerable time and computing resources to accomplish since a comparison between all the attributes and associations of the nodes or computing devices within the existing network and the user's or administrator's intended provisioning (e.g., the second network intent) of the network 104 must be performed.

Thus, the present systems and methods forego an end-to-end comparison of the first network intent and a second network intent created via the modification at the CFS. Instead, as depicted at 108, a modification of at least one object within the first network intent may be identified. The modification defines the delta between the first network intent and a second network intent. This delta is significantly smaller in size relative to both or either the first network intent and a second network intent and, therefore, may create a significantly smaller impact on the computing and data transmission resources of the IBN system 100.

The delta may be used instead of the second network intent as the basis by which the network controller 102 may modify the RFS device model which is used to generate device configuration(s) 118 used to, in turn, effect changes within the network 104 being provisioned. The network controller 102 engages in validation, augmentation, persistence/snapshotting, translation and/or other network intent based functions on the delta to create the device model using the device configuration(s) 118 pushed to the network 104 for provisioning.

Figure 2:
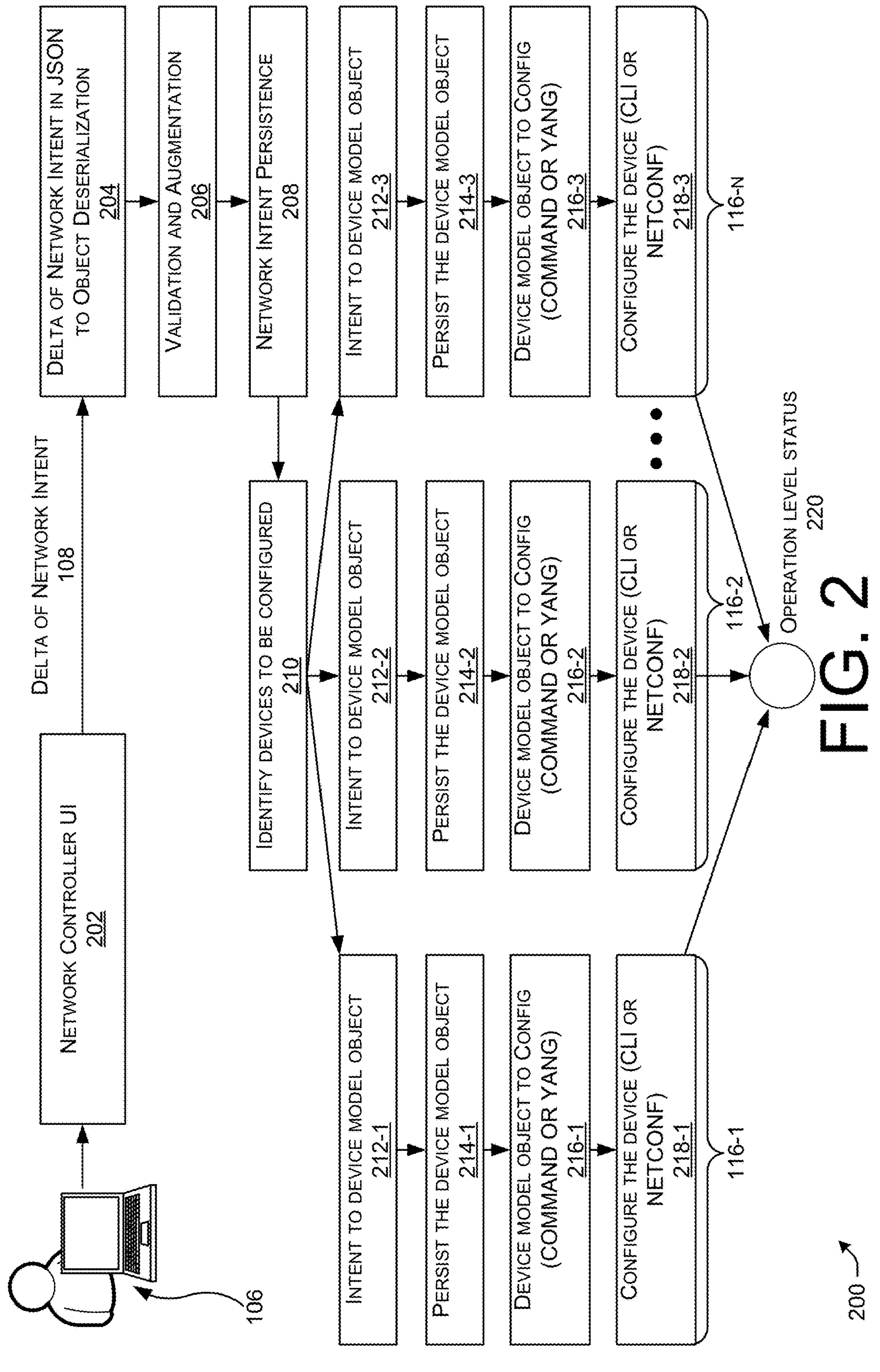
FIG. 2 illustrates a workflow diagram of a service provisioning process within the network of FIG. 1, according to an example of the principles described herein.

FIG. 2 illustrates a workflow diagram of a service provisioning process 200 within the network 104 of FIG. 1, according to an example of the principles described herein. In one example, the network controller 102 may include a UI 202 that is provided to the client device 106 as described above. The administrator makes changes to the first network intent to create the delta. The UI of the network controller 102 may send the delta of the network intent 108 to a back-end service in the network controller 102 for provisioning. At 204, the delta of the network intent 108 may be presented in JSON and converted into the network intent object via object deserialization.

In one example, a modeling tool may be utilized that allows network service and/or provisioning application developers to create new models, class diagrams, etc. The developers (e.g., a service intent developer, an application team, or a plugin developer) may create an entity by listing the attributes with appropriate datatypes to represent the domain model. Further, associations may be defined between different entities such as the different network devices 116 within the network 104. During the model build process, there is a code generator that generates classes, relational mapping files from the entity, and association definitions. The classes may then be compiled, and runtime artifacts may be generated. The artifacts may be consumed by applications and/or plugins in the network controller 102. The relational mapping files in the artifacts may be used by object/relational mapping (ORM) components running in the services.

The classes may be used by the service provisioning framework 110 for deserializing the JSON with changes sent from the network controller UI 202. The classes may also be used by the code of the domain plugins for validation, augmentation, and translation of the network intent. In one example, network service provisioning teams or plugin teams may use a modeling environment to define the CFS network intent model which is displayed in the network controller UI 202 to the administrator. Further, the network service provisioning teams may use the modeling environment to define the RFS device models which are collected from and/or deployed to the network devices 116 within the network 104.

Once the intent object graph is formed, the CFS intent graph may be validated and/or augmented at 206. In one example, the administrator may have entered an incorrect value via the network controller UI 202. Validation of the CFS intent model assist the administrator in not creating an intent model that is invalid. Further, the CFS intent model may be augmented with additional data. Once validation and augmentation at 206 is completed, the network intent including the delta may be persisted in a database such as a database of the network controller 102 at 208.

At 210, the network devices 116 within the network 104 impacted by the modification as defined by the CFS intent model and the delta and which are to be configured may be identified. At each network device 116-1, 116-2, 116-N, where N is any integer greater than or equal to 1 (collectively referred to herein as computing device(s) 116 unless specifically addressed otherwise) within the network 104, the CFS network intent as defined by the delta may be translated into the RFS device model objects operations at 212-1, 212-2, and 212-3, respectively for each of the network devices 116.

At 214-1, 214-2, and 214-3, respectively, the RFS device model objects may be persisted in a database such as a database of the network controller 102. The operations on the RFS device model objects may be converted to configurations (e.g., commands or YANG at 216-1, 216-2, and 216-3, respectively. The configurations may then be deployed to the devices at 218-1, 218-2, and 218-3, respectively (e.g., CLI or NETCONF).

At 220, the operation level status of the network 104 with the new CFS network intent as defined by the delta may be obtained, stored, and/or reported to the client device 106, the network controller 102, other devices, and combinations thereof.

As an example of the service provisioning process 200 of FIG. 2, a network settings provisioning process may utilize this process. In this example, a AAA server, a DHCP server, NTP servers, NetFlow exporter, and a DNS server settings may be configured for a number of network devices 116 within the network 104. For a number of the network devices 116, an administrator may make changes in the network settings having the AAA server, the DHCP server, NTP servers, a NetFlow exporter, and the DNS server. A network intent including the delta may be created and sent from the network controller UI 202 in, for example, JSON format. Specifically, the network intent may include the second network intent that includes the original, first network intent before the modifications were made as well as the changes made by the administrator. As more modifications are made to the first network intent (or subsequent versions thereof) the size of the network intent increases.

Once the intent model is constructed, the intent model is validated and augmented with additional data. In one example, if the administrator has not provided any name for the NetFlow settings, then the backend may automatically populate a default name. Further, in one example where the administrator wishes to provision an interface, rather than asking the administrator for an internet protocol (IP) address, the network controller 102 and/or any back-end server may reserve an IP address for the interface from an IP address management (IPAM) system and add that reserved IP address to the network intent. Complex algorithms may also be run in the backend to update the intent. Because this augmentation is performed without input from the administrator, the process of provisioning the network devices 116 within the network is simplified for the administrator by automatically calculating the intent of the administrator. Further, the changes resulting from the augmentation are also stored as delta in the network intent snapshot.

After validation and augmentation of the network settings provisioning process example described above in connection with 206, the network intent defining the network settings provisioning maybe persisted in a database. Thus, the network intent may include a CFS model graph with the changes directly made by the customer as well as changes made via the network controller 102. Stated another way, the delta of the network intent may be validated and augmented to include changes made by the administrator as well as autonomous changes made by via the network controller 102.

In the example of network settings provisioning described above, the network devices 116 impacted by the delta defining the changes to the network settings of network intent may be identified. The service plugins described herein identify the devices based on the network intent and the delta. In another example related to QoS policy provisioning, all the devices that are part of the scope of the QoS policy may be identified as being impacted by the delta defining the changes to the network intent. Thus, the network provision processes described herein have applicability to a myriad of different types of network provisioning processes.

Moving again to the network settings provisioning example described above, once the devices impacted by the delta defining the changes to the network intent, for each impacted device, a CFS network intent to RFS device model translation or conversion may be performed by the plugins in the network controller 102. The RFS model may include a comprehensive RFS model, and the plugin may include logic to calculate and fill in values not directly specified in the CFS model. For example, name, ipAddress and port information may be specified in a NetflowSettings CFS model. The plugin may calculate the source interface and also set time-to-live (ttl) values, descriptions, and the transport protocol(s). The below table defines examples of a CFS model and corresponding RFS device model conversions for NetFlow Settings.

TABLE 1

Network Intent to Device Model Conversion

| CFS or Network Intent NetFlow Settings | RFS or Device Model NetflowExporterRfs |
|---|---|
| name | name |
| ipAddress | ipAddress |
| port | port |
| | source interface (calculated by plugin) |
| | ttl (calculated by plugin) |
| | transport (calculated by plugin) |
| | description (calculated by plugin) |

The network intent as defined by the delta may include create, update, and delete of various parts of the intent graph. In this manner, the administrator's desired changes to the network devices 116 may be changed into a set of instructions that may be utilized to bring about the changes. Depending on the network 104 and the types of network devices 116 included therein, the RFS device model may be different while the CFS may be identical irrespective of the network 104 and the types of network devices 116 included therein. This is because although similar network devices 116 may perform similar tasks, different brands, models from different manufacturers, etc. of network devices 116 may require different RFS device model configurations (potentially due to varying feature support) whereas the CFS network intent is a relatively higher level of abstraction and may be described as a device agnostic model. In an example where the CFS network intent is not able to be implemented on any network device 116 even after translation to the RFS device model, the process may fail, and the administrator may be informed of such a failure via, for example, a message sent via the network controller UI 202. A similar failure may occur when, for example, computing resources on a network device 116 have been totally consumed, a network device 116 may not exist, or no more IP addresses are left.

As to the network settings provisioning example, the RFS device model may be persisted in data storage such as the database. The network controller 102 of the IBN system may invoke create, update, and/or delete CLI/YANG writers developed by domain teams for each RFS object operation. Because both the CFS network intent and the RFS device model are device agnostic, a device native model may be generated by the IBN system 100 using the writers to ensure that different brands, models from different manufacturers, etc. of network devices 116 obtain appropriate RFS device model configurations based on their different device native models. Thus, the writers generate commands (e.g., config commands or YANG) from RFS object operations. The network controller 102 may aggregate the configuration commands from all the writers. In examples not enabled in the present systems and methods, the IBN system 100 may compare the currently running configurations from the network device 116 with the configuration commands from the whole network intent. However, because the delta is obtained from the interaction between the client device 106 and the network controller 102, no comparison is required, and the configuration commands obtained from the RFS device model objects is based on just the delta and the network devices 116 within the network 104 that are impacted. Provisioning will be faster if a minimal RFS objects are processed, translated, and configured for the intent. The below table presents some examples of the RFS device model, operations performed thereon, and the configuration commands pushed to the respective network devices 116.

TABLE 2

Device Model Operation to Config Conversion

| RFS or Device Model | Operation | CLI |
|---|---|---|
| NetflowExporterRfs | Create | flow exporter DNAC-FNF-EXP<br>destination 3.3.3.3<br>transport udp 3333<br>description "configured by Cisco DNAC"<br>source GigabitEthernet0/0/1<br>ttl 10 |
| NetflowExporterRfs | Delete | flow exporter DNAC-FNF-EXP<br>no destination<br>no transport<br>no description<br>no source<br>no ttl<br>no flow exporter DNAC-FNF-EXP |

As mentioned herein, the CFS network intent may be translated into an RFS device model. Three examples of this translation not enabled in the present systems and methods include full RFS generation, full RFS generation and differential calculation, and full CFS differential calculation and RFS generation as performed at 212. In a full RFS generation process, the entire CFS network intent is converted into RFS device model operations and provisioned to the network devices 116 of the network 104. For example, in an instance where only NetFlow-related settings are modified, the RFS objects may be generated for the whole of the network intent including AAA settings, DHCP settings, NTP Settings, DNS Settings and not just the part of the intent that's modified in the current operation.

The downstream layers may process all of the RFS objects and identify that only NetFlow settings are modified. The IBN system 100 in this example will send configuration commands related to NetFlow settings but is still required to perform other processing including the processing of the AAA settings, DHCP settings, NTP Settings, DNS Settings. Thus, in a full RFS generation process, even if the administrator changes just the NetFlow related settings, resulting in additional processing time and resources.

In a full RFS generation and differential calculation process, the entire network intent is converted into an RFS device model for all network devices 116, and a difference is calculated between an existing RFS device model from inventory (cache) and the new RFS device model obtained from the network intent for each device. In this process, only RFS objects that are modified (e.g., created, updated, and/or deleted) are provisioned. For a modification in just NetFlow settings, RFS objects are generated for whole network intent as described above. The plugin (e.g., plugin, network service provisioning, and/or application teams) may write custom code to calculate a difference between the new RFS device model and the existing RFS device model in the cache which is periodically synchronized from the device. After the difference is calculated, only the NetFlow settings RFS device model is sent for deployment. Because of this additional comparison, extraneous processing time and resources are expended.

Further, in a full CFS differential calculation and RFS generation process, a difference is calculated between an existing CFS network intent and new incoming CFS network intent. Logic used to perform this task may traverse an entirety of a network intent graph of the existing CFS network intent (e.g., a first network intent) and an entirety of a network intent graph of the new incoming CFS network intent to calculate the difference. Based on changes identified in the differential calculation, RFS object modifications are generated and persisted and provisioned. Thus, for a change in just NetFlow settings, the existing CFS network intent is still compared to the new CFS network intent with respect to AAA settings, DHCP settings, NTP Settings, DNS Settings, and NetFlow settings. However, only NetFlow settings are included in the difference, and the RFS device model including the modifications to the NetFlow settings is generated and sent for deployment. However, like the other above-described CFS network intent to RFS device model translation processes, extraneous processing time and resources are expended when the existing CFS network intent and the new incoming CFS network intent are compared, and the differential is calculated.

The present systems and methods provide for model change tracking in which a modeling environment may be used to create a CFS network intent and an RFS device model. The use of the modeling environment is described above.

In the model change tracking process of the present systems and methods, the code generator generates code such that the CFS and the RES entities extend from a base class referred to herein as an InstanceImpl base class. The delta may be defined by a changeLogList of type ChangeLogItem to store the modification of the at least one object in the InstanceImpl base class. The ChangeLogItem includes a name, a type, and a property type. The type may include at least one of SET, ADD, REMOVE, ADD_AT_INDEX, REMOVE_AT_INDEX, or combinations thereof. The change log item may include all the required information to replay and/or recreate the change to the intent at the controller end. For single properties and 1-1 associations this may include changes to the property and/or association, for properties that contain collections or n-n associations this would include the position of the change in the collection. The property type may include at least one of an attribute, an association, or combinations thereof. Further, logic may be added to the changeLogList for every instance of attribute or association of every CFS entity and every RFS entity. In this manner, whenever a modification is made to an object by the administrator or a plugin in the backend for automatic calculation, the changeLogList is captured resulting in all modifications being captured. The changeLogList is stored in the objects and the objects are persisted in a database such as a database of the network controller 102.

Further, the network controller 102 may store the network intent as defined by the delta; the delta being defined by the changeLogList. The delta including the changeLogList stored in the respective objects may be sent to the network controller 102 from the client device 106, for example. When the network controller 102 receive the delta, these plugins may just read the changes made at the client device 106 by utilizing the delta including the changeLogList that is included within the objects. The instructions may include the execution of a command to get the changeLogList (e.g., getChangeLogList). Thus, rather than sending the entirety of the and requiring significantly larger processing time and resources, the delta may be sent result in very minimal use of the computing resources.

In one example, a number of classes for ChangeLogItem, ChangeLogAttribute Value, ChangeLogAssociation Value along with the InstanceImpl may be included within the code provided to the network controller 102. In one example, a number of Java "getters" and "setters" may be generated when creating these classes with the getter method returning the value of the attribute and the setter method taking a parameter and assigning it to the attribute. The plugin (e.g., plugin(s) 320 of FIG. 3) business logic operates on intent object graphs for augmentation during provisioning. When plugin augmentation logic executes, the changes are automatically captured by the setter methods. Examples of the network intent and how changes are made thereto are provided in connection with the method 500 of FIG. 5 herein. The intent JSON and/or code presented herein is merely illustrative of some examples that fall within the scope of the claims of the present systems and methods, and any divergence from the copyrightable subject matter that maintains the functionality of the systems and methods described herein fall under the scope of the claimed subject matter of this application.

Figure 3:
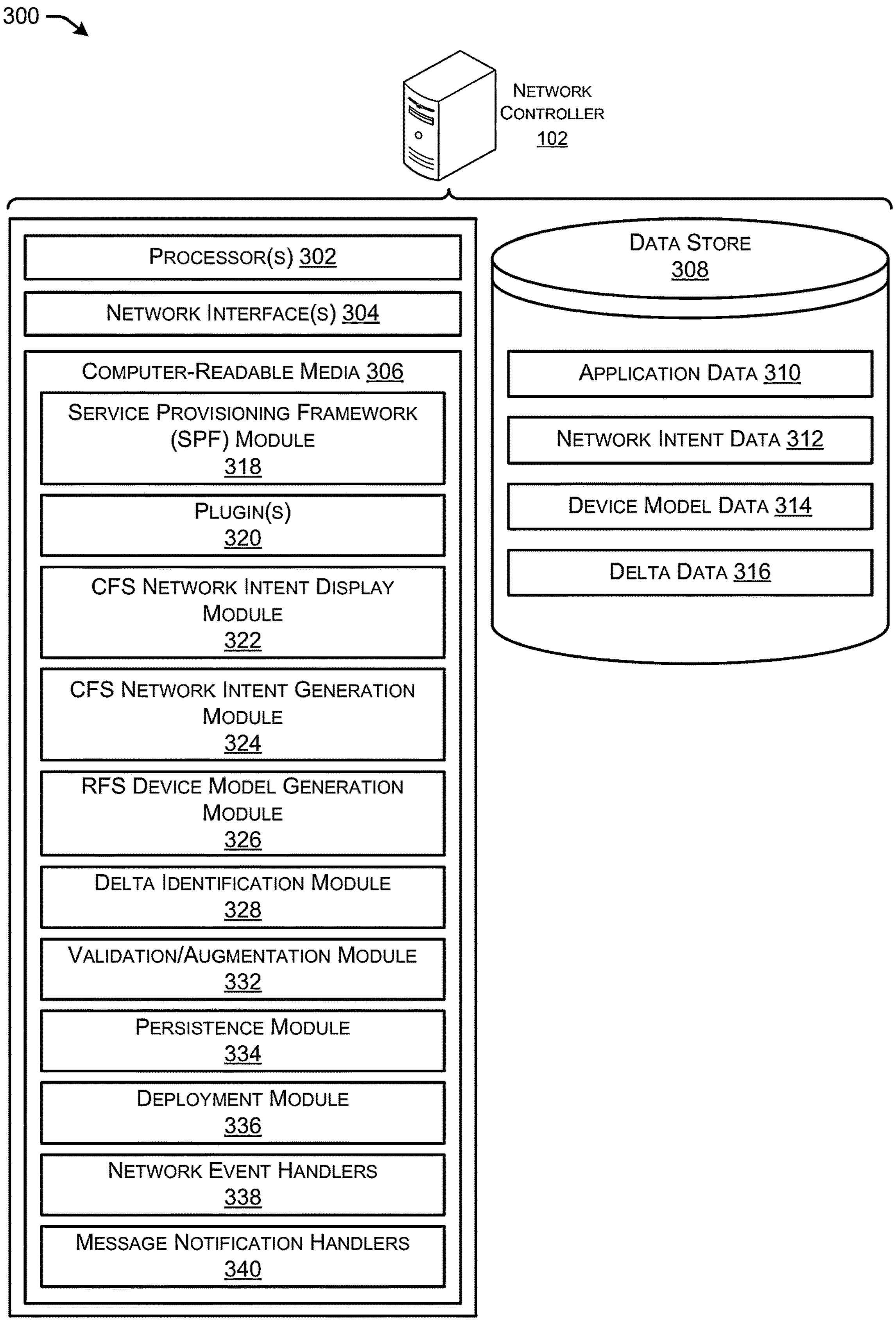
FIG. 3 illustrates a component diagram of example components of a network controller, according to an example of the principles described herein.

FIG. 3 illustrates a component diagram of example components of a network controller 102, according to an example of the principles described herein. As illustrated, the network controller 102 may include one or more hardware processor(s) 302 configured to execute one or more stored instructions. The processor(s) 302 may comprise one or more cores. The processor(s) 302 may define a level of computational power or processing resource available to the network controller 102 for provisioning a network including identifying a first CFS network intent of the computing network 104 based at least in part on an execution of a UI or an API layer at the client device 106 and identifying a modification of at least one object within the first CFS network intent within the UI at the client device 106 as the first CFS network intent is being modified where the modification defines a delta between the first CFS network intent and a second CFS network intent. The number of processor(s) and/or processing power provisioned within the network controller 102 may be sufficient to process data packets according to the methods described herein.

Further, the network controller 102 may include one or more network interfaces 304 configured to provide communications between the network controller 102 and other devices, such as devices associated with the IBN system 100 of FIG. 1 including the network devices 116 within the network 104, the client device 106, and/or other systems or devices associated with the network controller 102 and/or remote from the network controller 102. The network interfaces 304 may include devices configured to couple to personal area networks (PANs), wired and wireless local area networks (LANs), wired and wireless wide area networks (WANs), and so forth. For example, the network interfaces 304 may include devices compatible with the client device 106, the network devices 116 within the network 104, and/or other systems or devices associated with the network controller 102. Compatibility in this example provides for access to the network 104 such that the network controller 102 may, in turn, access the network devices 116 within the network 104 and/or any other computing devices described herein.

The network controller 102 may also include computer-readable media 306 that stores various executable components (e.g., software-based components, firmware-based components, etc.). In one example, the computer-readable media 306 may include, for example, working memory, random access memory (RAM), read only memory (ROM), and other forms of persistent, non-persistent, volatile, non-volatile, and other types of data storage. In addition to various components discussed herein, the computer-readable media 306 may further store components to implement functionality described herein. While not illustrated, the computer-readable media 306 may store one or more operating systems utilized to control the operation of the one or more devices that comprise the network controller 102. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the network controller 102 may include a data store 308 which may comprise one, or multiple, repositories or other storage locations for persistently storing and managing collections of data such as databases, simple files, binary, and/or any other data. The data store 308 may include one or more storage locations that may be managed by one or more database management systems. The data store 308 may store, for example, application data 310 defining computer-executable code utilized by the processor 302 to execute the components stored within the computer-readable media 306. Further, the application data 310 may include data relating to the execution of network provisioning processes and user interfaces (UIs), and any other data related to the execution of the components.

Further, the data store 308 may store network intent data 312. The network intent data 312 may include any data obtained and/or created by the network controller 102 before modification, and any new or modified network intent that may be utilized to prepare device models for provision the network devices 116 in the network 104. The network intent data 312 may include, for example, data defining CFS intent data as currently implemented and provisioned within the network 104 as well as CFS intent data as modified by an administrator at the client device 106 and which is to be implemented and provisioned within the network 104 as described herein.

The data store 308 may further store RFS device model data 314. The RFS device model data 314 may be translated from the network intent data 312 and used as a means by which the network devices 116 within the network 104 are provisioned as defined by the network intent data 312.

The data store 308 may further store delta data 316. As described herein, rather than performing operations related to a partial or end-to-end (e.g., complete) comparison between a first network intent and a second network intent, the present systems and methods may identify modifications of the first network intent as the modifications are being made and capture those modifications in the form of the delta data 316. The delta data 316 may include the changeLogList of type ChangeLogItem to store the modification of at least one object of the CFS network intent in an InstanceImpl base class. The ChangeLogItem includes a name, a type, and a property type. The type includes at least one of SET, ADD, REMOVE, ADD_AT_INDEX, REMOVE_AT_INDEX, or combinations thereof, and the property type incudes at least one of an attribute, an association, or combinations thereof. In one example, the network controller 102 and/or any back-end server may create a snapshot including the JSON form of network intent as defined by the delta; the delta being defined by the changeLogList. During the translation step described herein and performed by the RFS device model generation module 326, the CFS network intent including recorded changes may be constructed from the JSON in the snapshot of the delta data 316. This snapshot may be persisted within the data store 308 as the delta data 316. Further, an object graph may be persisted in the data store 308 and serialized as JSON.

The computer-readable media 306 may store portions, or components, of services related to the provisioning of the network 104 and the individual network devices 116 included therein. For example, the provisioning services of the computer-readable media 306 may include a service provisioning framework (SPF) module 318 to, when executed by the processor(s) 302, assist the network controller 102 in provisioning various network services such as, for example, the SDA, application policies, copy policies, and encrypted traffic analytics, among other network services. The SPF may also support a plugin architecture based on the network service type that is provisioned.

The computer-readable media 306 may also include a number of plugin(s) 320. The plugin(s) described above, and the use cases described in connection thereto assist in describing the plugin(s) 320 here. The plugin(s) 320, supported by the SPF module 318 and when executed by the processor(s) 302, may cause custom code and/or fingerprinting be written to calculate a difference between the new RFS device model and the existing RFS device model, utilize Java classes to validate, augment, and/or translation of the network intent. Plugins may be written by application teams and may include logic to update or complement the CFS graph. Changes made to the intent model data 314 in the back-end may be tracked for every object by the plugin(s) 320. For example, an administrator may not choose flow exporter name for NetFlow settings in the UI. In this example, the plugin(s) 320, in the back-end, may fill in this information with default value 'DNAC-FNF-EXP'. Further, during translation, the network intent including recorded modifications may be constructed from the JSON in the delta data 316. The plugin(s) 320 may read the changeLogList from the intent model and process the changeLogList as follows: List<ChangeLogItem>changeLogItems=networkSettingsIntentWithChangeTracking.getChangeLogList( ); As mentioned above, if the changeLogList only has NetFlow settings, then only that specific translation method is invoked and the RFS object operations (NetflowExporterRfs) are generated. Remaining translations such as AAA, DHCP, DNS and NTP settings may be ignored because they did not change in the current operation.

The computer-readable media 306 may also include a CFS network intent display module 322 to, when executed by the processor(s) 302, assist in the display of the iterations or versions of the CFS network intent displayed on the client device 106. This allows the administrator to view the result of any changes made to the CFS intent model by displaying in real time those changes on the client device 106.

The computer-readable media 306 may also include a CFS network intent generation module 324 to, when executed by the processor(s) 302, The CFS network intent generation module 324 may assist the administrator in modifying the network intent and generating the network intent for provisioning the network 104.

The computer-readable media 306 may also include validation/augmentation module 332 to, when executed by the processor(s) 302, to validate and/or augment the CFS intent module. As described above, validation of the CFS intent model assists the administrator in not creating an RFS device model that is invalid, and augmentation provides the network intent with additional data by running logic in the backend such as name of Flow Exporter or IP address reserved from IPAM.

Thus, the computer-readable media 306 may also include a delta identification module 328 to, when executed by the processor(s) 302, capture the changes to the CFS network intent as the changes are being made by the administrator at the client device 106.

The computer-readable media 306 may also include an RFS device model generation module 326 to, when executed by the processor(s) 302, assist in the generation of the RFS device model based on the modifications made to the CFS network intent and the delta identified during the process. The RFS device model generation module 326 may also, when executed by the processor(s) 302, translate the higher-level CFS network intent to a device-based RFS device model that may be pushed to the network devices 116 within the computing network 104 for provisioning purposes.

The computer-readable media 306 may also include a persistence module 334 to, when executed by the processor(s) 302, store or persist various elements described herein. For example, the persistence module 334 may store or persist the CFS network intents as the network intent data 312, the deltas as the delta data 316, the RFS device models as the device model data 314, the RFS object modifications, and other elements that may be stored or persisted during the processes described herein. The persistence module 334 may store or persist these elements in a database such as the data store 308 of the network controller 102 and/or a database of the client device 106. The computer-readable media 306 may also include a deployment module 336 to, when executed by the processor(s) 302, provision the network 104 based on the delta and the RFS device model as described herein.

Further, the computer-readable media 306 may also include network event handlers 338 to, when executed by the processor(s) 302, receives traps/notifications from computing devices and automatically deploys any new/updated intent.

The computer-readable media 306 may also include message notification handlers 340 to, when executed by the processor(s) 302, provide notifications of change within the network 104 that may be consumed by the network controller 102. The network event handlers 338 and/or the message notification handlers 340 act as additional network controller services 112 that provide at least a portion of the network intent that may be applied by the network controller 102 in provisioning the network devices 116 within the network 104.

Figure 4:
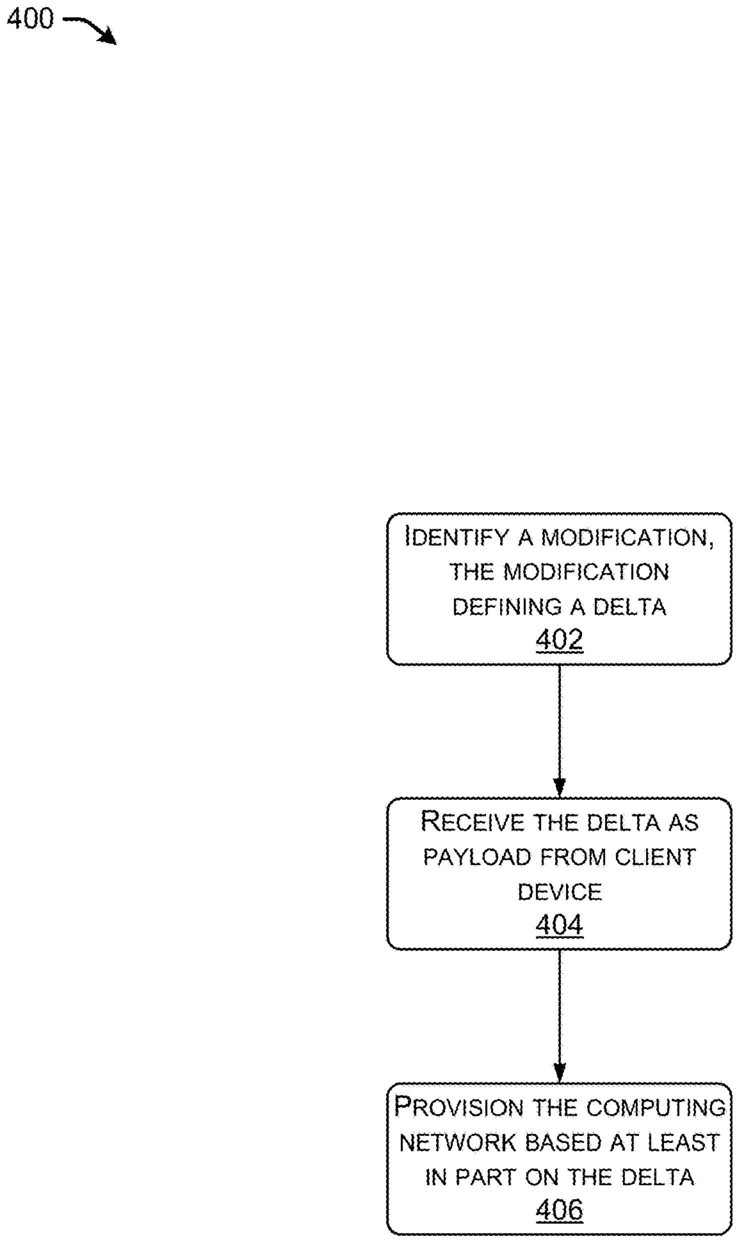
FIG. 4 illustrates a flow diagram of a network provisioning process, according to an example of the principles described herein.

FIG. 4 illustrates a flow diagram of a network provisioning method 400, according to an example of the principles described herein. The network provisioning method 400 may include, at 402, identifying, with the client device 106 and/or the network controller 102, a modification of at least one object within a first network intent of a computing network 104 as the first network intent is being modified. The modification defines a delta between the first network intent and a second network intent. The second network intent defines the administrator's desired changes to a current provisioning of the network devices 116 within the network 104. The client device 106 and/or the network controller 102 do not compare the first network intent to the second network intent as this end-to-end comparison of the very large network intents utilizes large amounts of computing resources including processing and data storage resources. Instead, the delta defines only those changes made to the first network intent that would define the second network intent to be provisioned within the network 104.

At 404, the network controller 102 and/or a number of back-end servers described herein may receive the delta as a payload from the client device 106. The delta may be defined by a changeLogList of type ChangeLogItem to store the modification of the at least one object in the InstanceImpl base class. The ChangeLogItem includes a name, a type, and a property type. The type may include at least one of SET, ADD, REMOVE, ADD_AT_INDEX, REMOVE_AT_INDEX, or combinations thereof. The property type may include at least one of an attribute, an association, or combinations thereof. Further, logic may be added to the changeLogList for every instance of attribute or association. In this manner, whenever a modification is made to an object by the administrator, the changeLogList is captured resulting in all modifications being captured. In one example, the capturing of the changeLogList may occur in real time or near real time. The changeLogList is stored in the objects and the objects are persisted in a database such as a database of the network controller 102 and/or a database of the client device 106.

The network provisioning method 400 may further include, at 406, provisioning at least one network device 116 within the computing network 104 based at least in part on the delta. More details regarding the network provisioning method 400 will be provided in connection with FIG. 5.

Figure 5:
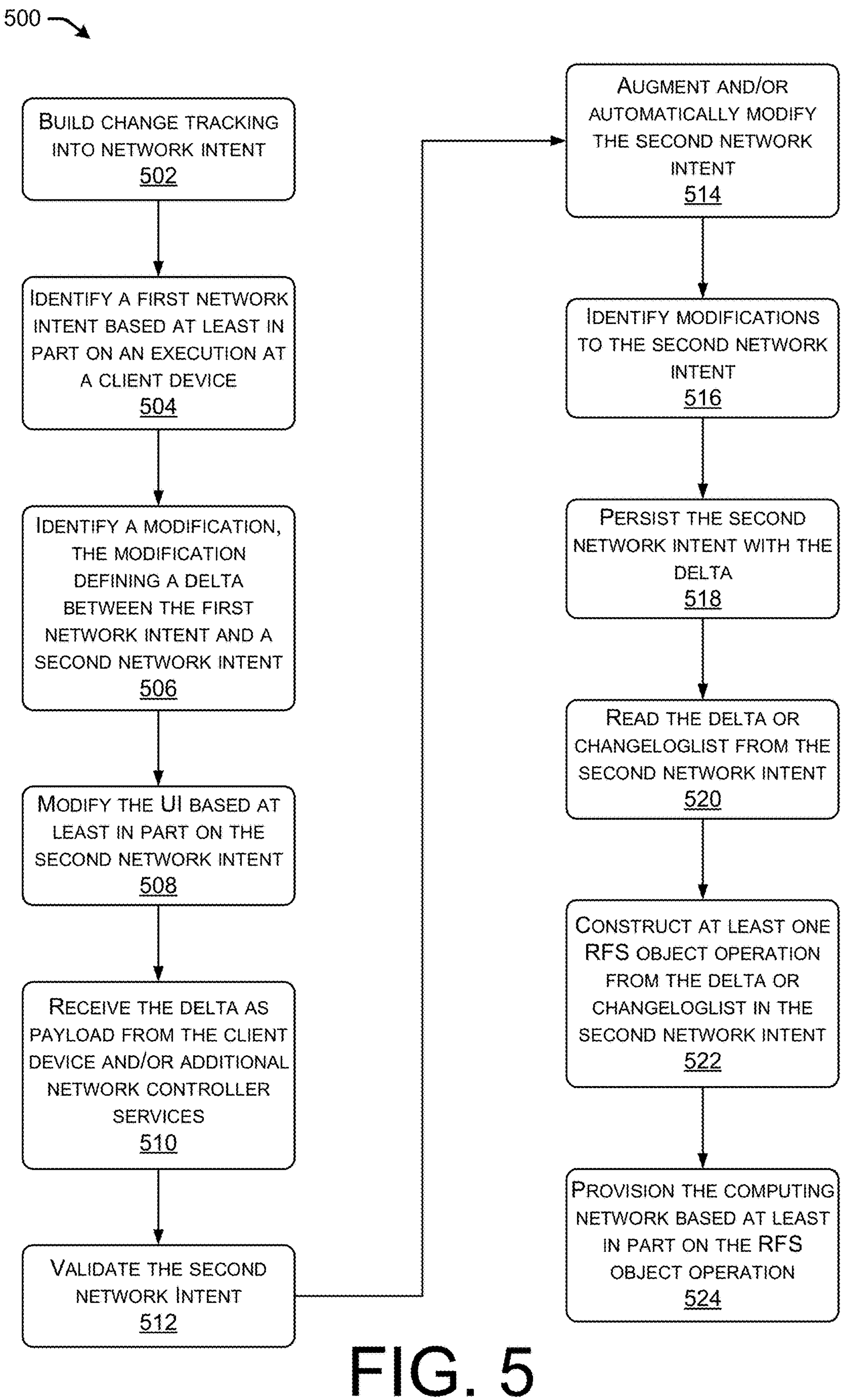
FIG. 5 illustrates a flow diagram of a network provisioning process, according to an example of the principles described herein.

FIG. 5 illustrates a flow diagram of a network provisioning process 500, according to an example of the principles described herein. The network provisioning process 500 may include, at 502, building change tracking into a network intent. As a preliminary process, the client device 106, the network controller 102, and other devices described herein may be configured and/or have the change tracking uploaded and installed thereon. Further, the change tracking may be executed in order to allow for the processing of changes to network intents. In one example, before the client device 106 interacts with the CFS and/or the CFS model, the code associated with the change tracking and used to generate the delta described herein may be injected into the CFS so that when an administrator, via the client device, modifies the CFS model, the delta is generated via the injected code.

In one example, the delta generation code may include a number of classes that may be common for a number of use cases described herein. Example of classes included within the delta generation code are enumerated in the below. In this example pseudocode, the associated Getters, Setters, Constructor, and other methods are not included for the purposes of brevity.

Example of Classes in Delta generation Code:

```
public class ChangeLogAttribute Value {
   private Object object;
   private int index;
}
public class ChangeLogAssociation Value {
   private String className;
   private long instanceId;
   private String instanceUuid;
   private int index;
}
public class ChangeLogItem {
   public enum ChangeLogTypeEnum {
      SET, ADD, REMOVE, ADD_AT_INDEX, REMOVE_AT_INDEX
   }
   public enum PropertyTypeEnum {
      ATTRIBUTE, ASSOCIATION
   }
   private String name;
   private ChangeLogTypeEnum type;
   private PropertyTypeEnum propertyType;
   private Object value;
}
public abstract class InstanceImpl {
   private List<ChangeLogItem> changeLogList = null;
   public void recordAttributeChange(String name, ChangeLogTypeEnum type,
      Object value, int index) {
   if (InstanceImpl.getChangeLoggingInProgress( )) {
      ChangeLogItem item = new ChangeLogItem( );
      item.setName(name);
         item.setType(type);
         item.setPropertyType(PropertyTypeEnum.ATTRIBUTE);
         if (value != null) {
            item.setValue(new ChangeLogAttribute Value(value, index));
         }
         addChangeLogItem(item);
      }
   }
   public void recordAssociationChange(String name, ChangeLogTypeEnum type,
Object value,
         int index) {
      if (InstanceImpl.getChangeLoggingInProgress( )) {
         ChangeLogItem item = new ChangeLogItem( );
         item.setName(name);
         item.setType(type);
         item.setPropertyType(PropertyTypeEnum.ASSOCIATION);
         if (value != null) {
            item.setValue(new ChangeLogAssociation Value((InstanceImpl) value, index));
```

-continued

Example of Classes in Delta generation Code:

```
        }
        addChangeLogItem(item);
      }
    }
    protected void addChangeLogItem(ChangeLogItem c) {
      if (changeLogList == null) {
        changeLogList = new ArrayList<ChangeLogItem>( );
      }
      changeLogList.add(c);
    }
  }
```

The above delta generation code is the main logic that tracks the attribute changes and association changes within the network intent. The classes included within the delta generation code may include, for example, ChangeLogAttribute Value, ChangeLogAssociation Value, ChangeLogItem. Further, the above delta generation code may include a number of base classes, such as, for example, InstanceImpl within the CFS models and RFS models with associated methods and may be implemented before the client device 106 interacts with the CFS and/or the CFS model. This delta generation code associated with the change tracking is used to generate the delta described herein and may be injected into the CFS well before an administrator modifies the CFS model and generates the delta. In one example, the delta generation code and its functions described herein are performed independent of the incremental network intent provisioning systems and methods of described herein. In one example, this injected delta generation code may be instantiated months before an administrator or other user utilizes the incremental network intent provisioning systems and methods of described herein.

In addition to the above preliminary delta generation code injection into the CFS, CFS model design code may also be utilized to allow a plugins 320 or an application team to design a CFS model. An example of a CFS model design code is presented below. In this example of network settings provisioning, NetworkDeviceSetting defines the CFS intent model.

Example of CFS Model Design Code:

```
NetworkDeviceSetting {
  String deviceIp;
  List<AAASetting> aaaSettings;
  DHCPSetting dhcpSetting;
```

-continued

Example of CFS Model Design Code:

```
  DNSSetting dnsSetting;
  NetflowSetting netflowSetting;
  NTPSetting ntpSetting;
}
NetflowSetting {
  String destinationIp;
  int destinationPort
  String exporterName;
}
```

In the example CFS model design code above, other entities such as, for example, the AAASetting, DHCPSetting, DNSSetting, NTPSetting are not described here for brevity. Further, in the above example of CFS model design code, a number of network settings such as AAASetting, DHCPSetting, DNSSetting, NetflowSetting, and NTPSetting, among other settings. These settings may be assigned a number of attributes. For example, the NetflowSetting in the example CFS model design code above may include three attributes including String destinationIp, int destinationPort, and String exporterName. In one example, the CFS model design code may be implemented at the time of development in a manner similar to the injection of the delta generation code described above and/or before time of development of the CFS.

In one example, a code generator may be executed to receive the CFS design model code and generate a number of classes. For example, the code generator may, in the above example of the NetFlow settings (e.g., NetflowSetting) within the CFS model design code, generate a proper class (e.g., public class NetflowSetting) extending from the base class wherein every attribute of the class has Getters and Setters that form a delta definition. The code generator generates code that is used to, in turn, identify the deltas. An example of the execution of the code generator is as follows:

Example of Generated Code

```
// Focusing on attribute change. Other variables and methods are ignored for brevity
public class NetflowSetting
  extends InstanceImpl {
  private String exporterName = null;
  /**
    * Getter for the 'exporterName' attribute.
    * The name of the flow exporter
    */
  public String getExporterName( ) {
      return this.exporterName;
  }
  /**
    * Setter for the 'exporterName' attribute.
    * The name of the flow exporter
```

-continued

Example of Generated Code

```
        */
    public void setExporterName(String exporterName) {
    recordAttributeChange("exporterName", ChangeLogTypeEnum.SET, false, null);
        this.exporterName = exporterName;
    }
}
// Focusing on association change. Other variables and methods are ignored for brevity
public class NetworkDeviceSetting
    extends InstanceImpl {
    private List<AAASetting> aaaSettings = new ArrayList<AAASetting>( );
    / **
        * Getter for the 'aaaSettings' end of the 'networkDeviceSettingHasAAASettings'
association.
        *
        */
    public List<AAASetting> getAaaSettings( ) {
        return this.aaaSettings;
    }
    / **
        * Setter for the 'aaaSettings' end of the 'networkDeviceSettingHasAAASettings' association.
        *
        */
    public void setAaaSettings(List<AAASetting> aaaSettings){
        recordAssociationChange("aaaSettings", ChangeLogTypeEnum.SET, false, null);
        if (aaaSettings != null) {
            this.aaaSettings = aaaSettings;
        }
        else {
            this.aaaSettings = new ArrayList<AAASetting>( );
        }
    }
    / **
        * Add a single entry to the 'aaaSettings' end of the 'networkDeviceSettingHasAAASettings'
association at position index.
        *
        */
    public void addAaaSettings(int index, AAASetting aaaSettings) {
        recordAssociationChange("aaaSettings",        ChangeLogTypeEnum.ADD_AT_INDEX,
false, aaaSettings, index);
        if (aaaSettings != null) {
            List<AAASetting> c = this.getAaaSettings( );
            add(index, c, aaaSettings);
        }
    }
}
```

The above generated code example focuses on attribute and association change methods, and other variables and methods have been removed or ignored for brevity reasons. Thus, at execution of the above-described code generator, a number of classes are generated. As to the above example of the NetFlow settings (e.g., NetflowSetting) within the CFS model design code, the setter method provided by the code generator invokes a record attribute change and/or a record association change from the respective base classes. For example, the NetworkDeviceSetting class has, for example, a list (e.g., List<AAASetting>aaaSettings) that defines a collection. In this example, when a setter method is called on the collection or a new object (e.g., AAASetting) is added to the collection, the method records the association change (e.g., recordAssociationChange). The execution of the code generator will be implemented before the client device 106 interacts with the CFS and/or the CFS model. Thus, the implementation of the delta generation code, the CFS model design code, and the code generator may occur at 502 of FIG. 5 in order to build change tracking into the network intent and prepare for the remainder of the method 500 of FIG. 5 to be processed. In this manner, change tracking is built into the network intent, and it is via this change tracking by which a delta described is determine and used to effectuate the provisioning of the computing network 104. The execution of the code generator may be implemented before the code or software associated with the delta generation code, the SPF plugins and generated CFS model is provided to a use and/or the client device 106.

At 504, the method 500 may further include identifying a first network intent of a computing network based at least in part on an execution of a user interface (UI) or API layer at a client device 106. An administrator may begin to modify the first network intent by interacting with the CFS displayed on a UI of the client device 106 that provides a high level of description of the current network intent (e.g., the first network intent).

Below is an example of JSON defining the manner in which identifying a first network intent of the computing network 104 may be determined at 504.

Example of Identification of Initial (e.g., first) Network Intent JSON:

```
{
    "@class": "com.cisco.dnac.model.cfs.setting.NetworkDevice-
    Setting",
    "aaaSettings": [
        "java.util.ArrayList",
        [
```

-continued

Example of Identification of Initial (e.g., first) Network Intent JSON:

```
        {
          "@class": "com.cisco.dnac.model.cfs.setting.AAASetting",
          "accountingPort": 1813,
          "authenticationPort": 1812,
          "instanceUuid": "c727db17-996e-4d70-a926-d5959f16613a",
          "ipAddress": "1.1.1.1",
          "sharedSecret": "encryptedSecretKey"
        }
      ]
    ],
    "deviceIp": "10.10.10.10",
    "dhcpSetting": {
      "@class": "com.cisco.dnac.model.cfs.setting.DHCPSetting",
      "instanceUuid": "61b83440-4c65-406e-9cf0-f274ecc28852",
      "serverIp": "3.3.3.3"
    },
    "dnsSetting": {
      "@class": "com.cisco.dnac.model.cfs.setting.DNSSetting",
      "domainName": "cisco.com",
      "instance Uuid": "5c5cca47-f8f5-4aa1-a9c8-ed54d3417c7e",
      "ip": "4.4.4.4"
    },
    "instanceUuid": "59190ac0-dfd3-4add-8b77-e894c5bb333f",
    "ntpSetting": {
      "@class": "com.cisco.dnac.model.cfs.setting.NTPSetting",
      "instanceUuid": "24586d3e-87b2-4e46-84da-05ed5b906f8d",
      "serverIp": "5.5.5.5"
    }
  }
```

It is noted here that the above example of the identification of the initial (e.g., first) network intent JSON has been significantly reduced in size for purposes of brevity alone and is used to demonstrate what aspects of a network intent may be considered when executing the methods described herein. In reality, the network intent JSON may be several thousands of pages or more than 5000 lines in length and cannot be included herein in its entirety. Indeed, more efficient processing of the cumbersome length of the network intent JSON is an objective the present systems and methods seek to overcome or avoid by identifying and transmitting the delta only in order to avoid transmission of the entire network intent JSON and/or processing a first network intent JSON and a second network intent JSON in their entireties in order to identify differences between the two.

In the example of the identification of the initial (e.g., first) network intent JSON above, the user or administrator may desire to create a NetFlow exporter in a computing device within the computing network 104, and may be seeking to transmit the destination IP address (e.g., destinationIP) and the destination port (e.g., destinationPort). At the UI (e.g., a UI of the client device 106 and/or the network controller UI 202), the user or administrator may enter the destination IP information and the destination port information. These changes may be reflected in a change log list (e.g., changeLogList) as indicated in the above example of the identification of the initial (e.g., first) network intent. Although the above example of the identification of the initial (e.g., first) network intent does not include a full listing of properties, it is understood that computing device being provisioned in the computing network 104 may be identified within this JSON, in practice a number of properties may be included therein that identifies the association of the to-be-provisioned computing device may be identified. However, as described herein, only a delta between the first network intent and a second network intent that is derived from the first network intent is captured and transmitted in order to significantly reduce the size of what would be and otherwise extremely large and ever growing network intent document. Further, processing the delta as opposed to an entire, unabridged network intent significantly reduces the computing resources required to provision the computing device within the computing network 104.

At 506, the client device 106 and/or the network controller 102 may identify a modification of at least one object within the first network intent within the UI at the client device and/or the network controller 102 as the first network intent is being modified. The modification defines a delta between the first network intent and a second network intent that is to be implemented to provision the network devices 116 within the network 104. Below is an example of the information transmitted from the UI (e.g., a UI of the client device 106 and/or the network controller UI 202) to the network controller 102. The data transmitted from the client device 106 to the network controller 102 may include the change log list (e.g., changeLogList).

Example of Data Transmitted from UI to Controller:

```
{
  "@class": "com.cisco.dnac.model.cfs.setting.NetworkDeviceSetting",
  "changeLogList": [
    "java.util.ArrayList",
    [
      {
        "@class": "com.cisco.xmp.model.framework.base.ChangeLogItem",
        "instanceUuid": "4feeldc5-cbf6-424a-b31f-621e2af01aae",
        "name": "netflowSetting",
        "propertyType": "ASSOCIATION",
        "type": "SET"
      }
    ]
  ],
  "netflowSetting": {
    "@class": "com.cisco.dnac.model.cfs.setting.NetflowSetting",
    "changeLogList": [
      "java.util.ArrayList",
      [
        {
          "@class": "com.cisco.xmp.model.framework.base.ChangeLogItem",
          "instanceUuid": "59835098-195b-4444-b263-abb6232d9979",
          "name": "destinationIp",
          "propertyType": "ATTRIBUTE",
          "type": "SET"
```

-continued

Example of Data Transmitted from UI to Controller:

```
        },
        {
          "@class": "com.cisco.xmp.model.framework.base.ChangeLogItem",
          "instanceUuid": "332611c3-356f-434a-91ee-laaf2d24c3f3",
          "name": "destinationPort",
          "propertyType": "ATTRIBUTE",
          "type": "SET"
        }
      ]
    ],
    "destinationIp": "3.3.3.3",
    "destinationPort": 3333,
    "instanceUuid": "558a5682-e56a-42ed-a773-15cc769f103c"
  }
}
```

In the example of the data transmitted from the UI to the network controller 102 above, the changeLogList may store any and all changes to an object within the network intent such as, for example, the above-mentioned destinationIP and destinationPort. Thus, at 506, the client device 106 and/or the network controller 102 may have logic to add to the changeLogList for every instance of attribute or association in the entity. In one example, the logic defining the modifications to the network intent are added to the changeLogList for every modified attribute and/or association in the instance.

As noted above, in the model change tracking process of the present systems and methods, all CFS and RFS entities extend from a base class referred to herein as an InstanceImpl base class. The delta may be defined by a changeLogList of type ChangeLogItem to store the modification of the at least one object in the InstanceImpl base class. The ChangeLogItem includes a name, a type, and a property type. The type may include at least one of SET, ADD, REMOVE, ADD_AT_INDEX, REMOVE_AT_INDEX, or combinations thereof. The property type may include at least one of an attribute, an association, or combinations thereof. As performed at 506, the logic may be added to the changeLogList for every instance of attribute and/or association. In this manner, whenever a modification is made to an object by the administrator, the changeLogList is captured resulting in all modifications being captured. In one example, the capturing of the changeLogList may occur in real time or near real time.

The network controller 102 and/or any back-end server may, at 508, modify the UI displayed on the client device 106 and/or the network controller UI 202 based at least in part on the second network intent. This allows for the user or administrator to visualize the changes being made to the network intent as a way to receive feedback on the modifications being made.

At 510, the delta may be received by the network controller 102 and/or any back-end server (e.g., the additional network controller services 112) in preparation for translation of the delta into an RFS device model. The above example of the data transmitted from the UI to the network controller 102 defines the delta. Thus, at 510, the delta may be received as a payload from the client device 106 at the network controller 102.

The second network intent (e.g., the second CFS intent model) is validated at 512. Also, as part of the validation, the CFS intent model may be augmented at 514 with additional data as described herein. Specifically, at 514, additional delta data or network intent data 114 may be received from the additional network controller services 112 via plugin(s) 320 or other means. As may be expected, a user or administrator may make changes to the network intent that may be required to be implemented in a different manner. Thus, in one example, plugin(s) 320 or other means may be provided via the additional network controller services 112 in order to effectuate these augmentations at 514. An example of the plugin(s) 320 or application code used to augment the network intent is presented as follows:

Example of Plugin or Application Code to Augment the Network Intent:

```
netflowSetting.setExporterName("DNAC-FNF-EXP");
// Underlying code implementation which is run.
/**
  * Setter for the 'exporterName' attribute.
  * The name of the flow exporter
  */
  public void setExporterName(String exporterName) {
    recordAttributeChange("exporterName", ChangeLogTypeEnum.SET,
     false, null);
          this.exporterName = exporterName;
  }
```

Once the network controller 102 receives the delta at 510, the delta is deserialized, and the validation of 512 is performed. At this point, the plugin(s) 320 augments the network intent as defined by the delta with a number of automatic calculations. At 514, the second network intent as defined by the delta may be augmented and/or automatically modified.

In the above example of the plugin(s) 320 or application code used to augment the network intent, the name of the exporter may be empty, so a default name (e.g., DNAC-FNF-EXP) may be provided. The object created from the input network intent JSON (e.g., the delta) includes the NetflowSeting. The plugin(s) 320 and/or additional network controller services 112 may invoke setExporterName. By invoking setExporterName, the plugin(s) 320 is able to also involve recordAttributeChange as similarly described above in connection with example of the delta generation code where the attribute changes and association changes within the network intent are recorded. In this manner, a number of changeLogItems may be added to the logic as described above in connection with 506.

The purpose of the plugin(s) 320 and/or additional network controller services 112 is to ensure that the network intent envisioned by the user or administrator may be actually implemented. Because in some instances computing resources, security policies, or other constraints may not allow for the changes requested by the user or administrator at 506 to be implemented, the plugin(s) 320 and/or additional network controller services 112 may, at 514, augment and/or automatically modify the second network intent as defined by the delta. In one example, augmentation and/or automatic modification may be performed by the network controller 102 and/or any back-end server.

Once exporterName is added to the network intent, the changeLogList includes the changes to the network intent added by the client device 106 as well as any changes to the network intent made automatically via the plugin(s) 320 and/or additional network controller services 112. The changes to the network intent added by the client device 106 and/or any changes to the network intent made automatically via the plugin(s) 320 and/or additional network controller services 112 define the delta. An example of the update to the network intent based on the changes to the network intent made automatically via the plugin(s) 320 and/or additional network controller services 112 may be as follows:

Example of Automatic Backend Intent Update to the Network Intent:

```
{
  "@class": "com.cisco.dnac.model.cfs.setting.NetworkDeviceSetting",
  "changeLogList": [
    "java.util.ArrayList",
    [
      {
        "@class": "com.cisco.xmp.model.framework.base.ChangeLogItem",
        "instanceUuid": "4feeldc5-cbf6-424a-b31f-621e2af01aae",
        "name": "netflowSetting",
        "propertyType": "ASSOCIATION",
        "type": "SET"
      }
    ]
  ],
  "netflowSetting": {
    "@class": "com.cisco.dnac.model.cfs.setting.NetflowSetting",
    "changeLogList": [
      "java.util.ArrayList",
      [
        {
          "@class": "com.cisco.xmp.model.framework.base.ChangeLogItem",
          "instanceUuid": "59835098-195b-4444-b263-abb6232d9979",
          "name": "destinationIp",
          "propertyType": "ATTRIBUTE",
          "type": "SET"
        },
        {
          "@class": "com.cisco.xmp.model.framework.base.ChangeLogItem",
          "instanceUuid": "332611c3-356f-434a-91ee-laaf2d24c3f3",
          "name": "destinationPort",
          "propertyType": "ATTRIBUTE",
          "type": "SET"
        },
        {
          "@class": "com.cisco.xmp.model.framework.base.ChangeLogItem",
          "instanceUuid": "033ca929-b6f3-4ec6-8902-882fd23f52e5",
          "name": "exporterName",
          "propertyType": "ATTRIBUTE",
          "type": "SET"
        }
      ]
    ],
    "destinationIp": "3.3.3.3",
    "destinationPort": 3333,
    "exporterName": "DNAC-FNF-EXP",
    "instanceUuid": "558a5682-e56a-42ed-a773-15cc769f103c"
  }
}
```

In a manner similar to the above, the network controller 102 and/or any back-end server may create a snapshot of the above automatic backup intent update including the JSON form of network intent as defined by the delta; the delta being defined by the changeLogList.

As part of the processing of 514 or as a separate process, the CFS network intent as defined by the delta may be translated into the RFS device model objects operations at 212-1, 212-2, and 212-3, respectively for each of the network devices 116. In the translation phase, the changeLogItems within the CFS network intent are identified, and generates the RFS model based on the type of the change the CFS network intent for the NetFlow settings. In the examples described herein, the NetFlow setting model is the CFS model of the CFS network intent. The RFS objects of the RFS model are created by taking the attributes of the CFS network intent and placing those attributes in the RFS model by setting the corresponding values from the CFS network intent such as in the case of destinationIP, destinationPort, and exporterName from the netflowSetting. In one example, some information included within the RFS model may not be included within the CFS network intent, so the translation may include these RFS model exclusive elements such as, for example, a description, a ttl value, and a source by calculating these values from the CFS network intent. As part of the deployment process, a number of CLIs may be generated from the RFS model operations.

At 516, a number of modifications to the second network intent as defined by the delta may be identified. These modifications may include the changes to the network intent added by the client device 106 and/or any changes to the network intent made automatically via the plugin(s) 320 and/or additional network controller services 112. At 518, the second network intent and the delta may be persisted in a data storage device such as the data store 308 as the network intent data 312 and the delta data 316 of FIG. 3.

The following is an example of the second network intent JSON in which the full network intent is generated apart from 502 through 518 of the method 500 of FIG. 5. As mentioned herein, this JSON may be very large since it does not include the change tracking provided by the present systems and methods. Again, as described above, the network intent JSON in reality may be several thousands of pages or more than 5000 lines in length and cannot be included herein in its entirety. Indeed, more efficient processing of the cumbersome length of the network intent JSON is an objective the present systems and methods seek to overcome or avoid by identifying and transmitting the delta only in order to avoid transmission of the entire network intent JSON and/or processing a first network intent JSON and a second network intent JSON in their entireties in order to identify differences between the two.

Example of Modified (e.g., second) Network Intent JSON (without delta):

```
{
  "@class": "com.cisco.dnac.model.cfs.setting.NetworkDevice-
  Setting", "aaaSettings": [
    "java.util.ArrayList",
    [
      {
```

-continued

Example of Modified (e.g., second) Network Intent JSON (without delta):

```
        "@class": "com.cisco.dnac.model.cfs.setting.AAASetting",
        "accountingPort": 1813,
        "authenticationPort": 1812,
        "instanceUuid": "c727db17-996e-4d70-a926-d5959f16613a",
        "ipAddress": "1.1.1.1",
        "sharedSecret": "encryptedSecretKey"
      }
    ]
  ],
  "deviceIp": "10.10.10.10",
  "dhcpSetting": {
    "@class": "com.cisco.dnac.model.cfs.setting.DHCPSetting",
    "instanceUuid": "61b83440-4c65-406e-9cf0-f274ecc28852",
    "serverIp": "3.3.3.3"
  },
  "dnsSetting": {
    "@class": "com.cisco.dnac.model.cfs.setting.DNSSetting",
    "domainName": "cisco.com",
    "instanceUuid": "5c5cca47-f8f5-4aa1-a9c8-ed54d3417c7e",
    "ip": "4.4.4.4"
  },
  "instanceUuid": "59190ac0-dfd3-4add-8b77-e894c5bb333f",
  "netflowSetting": {
    "@class": "com.cisco.dnac.model.cfs.setting.NetflowSetting",
    "destinationIp": "2.2.2.2",
    "destinationPort": 2222,
    "exporterName": "DNAC-FNF-EXP",
    "instanceUuid": "f8cc140b-6bc8-4638-8a8d-5ee58b08bd71"
  },
  "ntpSetting": {
    "@class": "com.cisco.dnac.model.cfs.setting.NTPSetting",
    "instance Uuid": "24586d3e-87b2-4e46-84da-05ed5b906f8d",
    "serverIp": "5.5.5.5"
  }
}
```

With this second network intent generated and persisted, it may be used to provision the computing network 104. At 520, the delta or the changeLogList from the second network intent may be read, and, at 522, an RFS object operation may be constructed from the delta or the changeLogList in the second network intent. In one example, the plugin(s) 320 may identify computing devices within the computing network 104 that are affected by the delta and/or the changeLogList from the second network intent to generate the RFS object operation.

Example of Translation:

```
List<ChangeLogItem>                    changeLogItems                =
networkSettingsIntentWithChange Tracking.getChangeLogList( );
  for(ChangeLogItem changeLogItem : changeLogItems) {
    if(changeLogItem.getName( ).equals("aaaSettings")) {
      // Generate RFS for AAA Settings
    } else if(changeLogItem.getName( ).equals("dhcpSetting")) {
      // Generate RFS for DHCP Setting
    } else if(changeLogItem.getName( ).equals("dnsSetting")) {
      // Generate RFS for DNS Setting
    } else if(changeLogItem.getName( ).equals("netflowSetting")) {
      // Generate RFS for netflow settings
      // Create NetflowExporterRfs object
      // Set destinationIp, destinationPort, exporterName from netflowSetting
      // Set description, ttl, source by calculation
    } else if(changeLogItem.getName( ).equals("ntpSetting")) {
      // Generate RFS for NTP Setting
    }
  }
```

At 524, provisioning the at least one network device 116 within the network 104 based at least in part on the delta may include constructing a RFS device model including the delta based at least in part on the serialized JSON in a snapshot. With the plugin(s) 320, the changeLogList may be read from a network intent graph at 520. Based at least in part on the changeLogList including only a NetFlow setting, the method 500 may include invoking a specific translation method associated with the changeLogList including the NetFlow setting and, at 522, generating at least RFS object operation. The RFS object operation may include, for example, create of NetflowExporterRfs. In one example, the method 500 may further include ignoring at least one remaining translation that does not change in the at least one RFS object operation such as, for example, AAA, DNS, DHCP, and/or NTP Settings. At 524, the method 500 may further include provisioning at least one network device 116 within the computing network 104 based at least in part on the RFS object operation.

Figure 6:
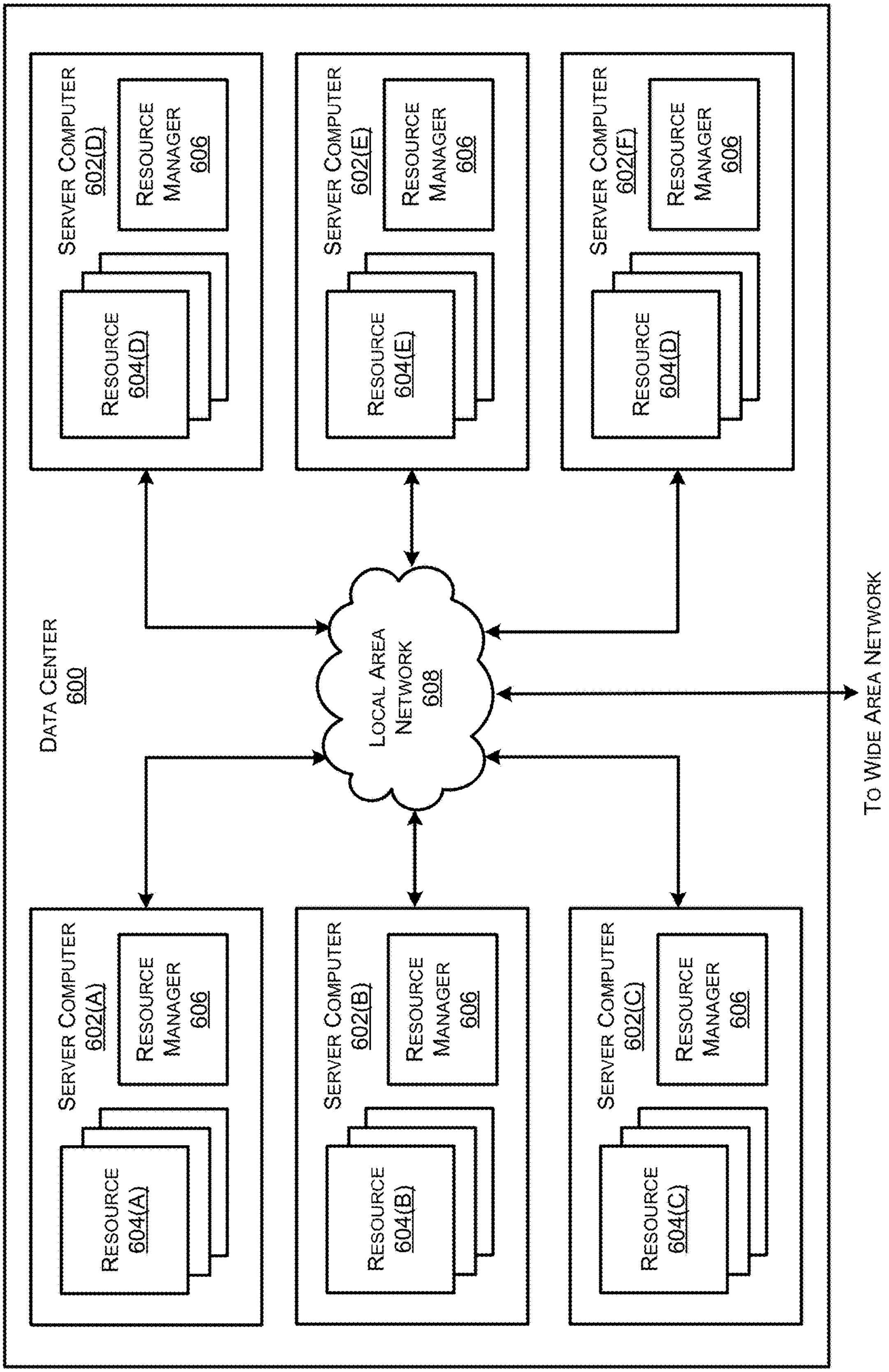
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may comprise any type of networked device, such as servers, switches, routers, hubs, bridges, gateways, modems, repeaters, access points, etc.

The server computers 602 may be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
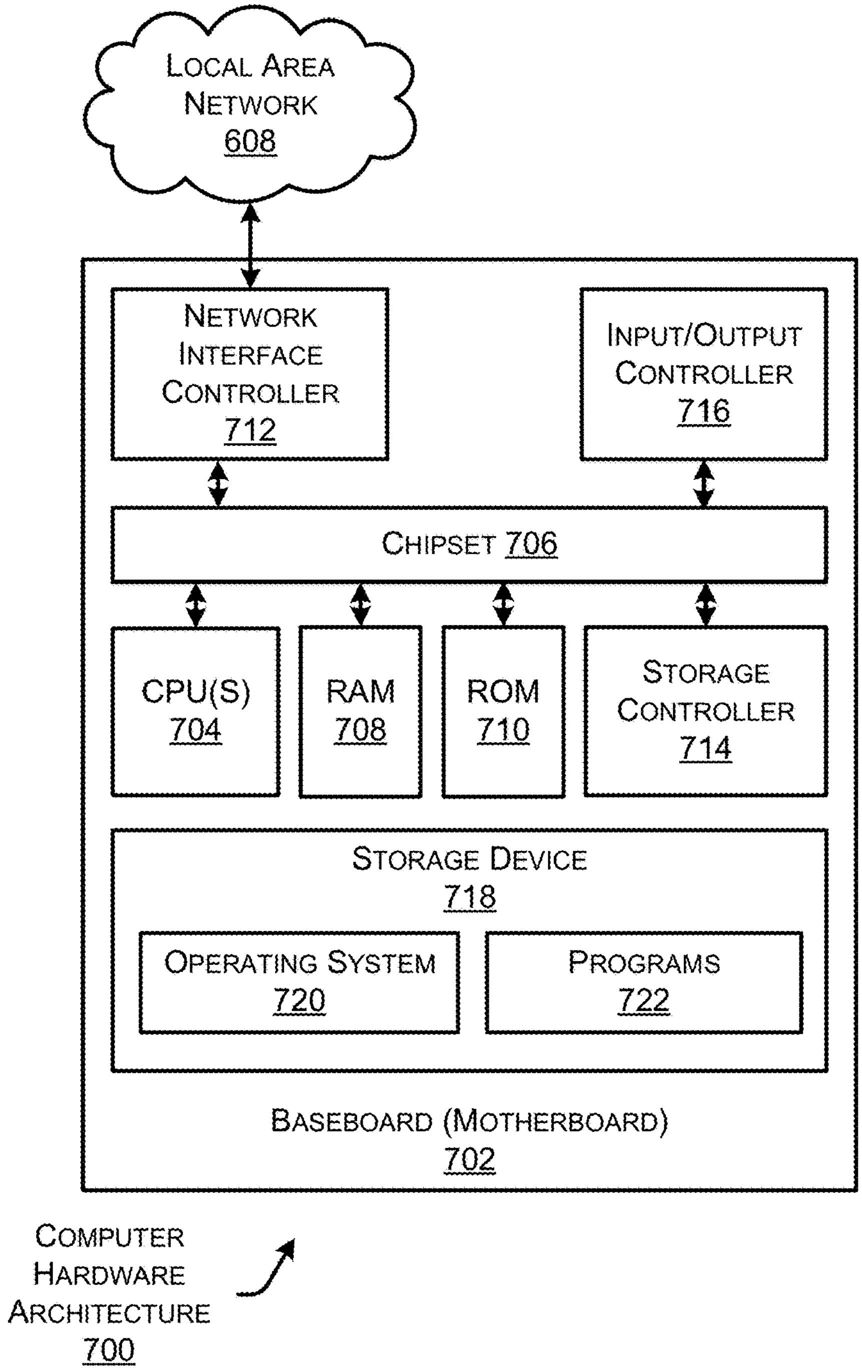
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the network controller 102, client device 106, the network 104, the network devices 116, and/or other systems or devices associated with the IBN system 100 and/or remote from the network controller 102, a workstation, a desktop computer, a laptop, a tablet, a network appliance, an e-reader, a smartphone, or other computing device, and may be utilized to execute any of the software components described herein. The computer 700 may, in some examples, correspond to a network device (e.g., network controller 102, client device 106, the network 104, the network devices 116 (and associated devices) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the network controller 102, client device 106, the network 104, the network devices 116, among other devices. The chipset 706 may include functionality for providing network connectivity through a Network Interface Controller (NIC) 712, such as a gigabit Ethernet adapter. The NIC 712 is capable of connecting the computer 700 to other computing devices within the IBN system 100 and external to the IBN system 100. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the network controller 102, client device 106, the network 104, the network devices 116, and or any components included therein, may be supported by one or more devices similar to computer 700. Stated otherwise, some or all of the operations performed by the network controller 102, client device 106, the network 104, the network devices 116, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may comprise one or more of the network controller 102, client device 106, the network 104, the network devices 116, and/or other systems or devices associated with the IBN system 100 and/or remote from the network controller 102. The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the network controller 102, client device 106, the network 104, the network devices 116, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for the network controller 102, client device 106, the network 104, the network devices 116 as described herein. The programs 722 may enable the devices described herein to perform various operations.

CONCLUSION

The examples described herein provide systems and methods of networking provisioning based on a delta of two network intents rather than processing the entirety of the network intent. In many provisioning operations, only a small part of the network intent is modified. The present systems and methods propose the use of "model change tracking" to efficiently calculate the difference between an existing network intent and a new incoming network intent. This reduces the overall provisioning time taken to push incremental changes in the network intent and also simplifies the translation of network intent to device model objects enabling rapid deployment of new IBN features.

The invention provides for calculating the intent (e.g. desired changes to network settings and provisioning) of the customer automatically instead of requiring the customer to directly configure the network devices or deal with Command Line Interfaces (CLIs). Further, processing simplicity is achieved for application plugins when the plugins receive specific changes in the CFS graph and are not required to write custom code to keep track of modifications in the CFS intent model. Further, provisioning performance is increased because translations are performed only for a modified portion of the CFS graph.

With the above-described systems and methods, the present systems and methods reduces payload size or on-wire size and reduces the number of buffers used on the send and receive between, for example, a client device and the network controller during the inter-process communication. This results in a significantly faster transmission of data from what may include a relatively very large network intent. Further, because an end-to-end comparison is not performed due to the acquisition of the delta at the CFS and provisioning of the CFS to the RFS, and comparison of all the nodes, attributes, and/or associations included within a network intent before and after a modification thereto, computing resources and memory utilization is drastically reduced. The data transfer sent from one service to another is greatly reduced since only the delta defining the difference between a first network intent and a to-be-implemented second network intent is sent rather than the entirety of the to-be-implemented second network intent. Due to the methods described herein of only processing the changes within a network intent, the provisioning of the network is relatively faster than other approaches.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of provisioning a configuration, comprising:
- identifying a first configuration intent of a computing device based at least in part on an execution of an application program interface (API) at a client device;
- identifying a modification of an object within the first configuration intent at the client device as the first configuration intent is being modified, the modification defining a delta between the first configuration intent and a second configuration intent, wherein:
  - the delta comprises a size that is smaller relative to the first configuration intent and the second configuration intent, and
  - the delta is defined by a change log identifying a type of change log item, the change log item storing the modification of the object in a base class;
- receiving the delta as a payload from the client device; and
- provisioning the second configuration intent on the computing device based at least in part on the delta.

2. The method of claim 1, further comprising automatically modifying the object based on the delta, wherein automatically modifying the object includes a further modification of the second configuration intent.

3. The method of claim 1, wherein:

the change log item includes a name, a type, and a property type, the type includes a method, and the property type incudes at least one of an attribute, an association, or combinations thereof.

4. The method of claim 3, wherein identifying the modification further comprises adding logic to the change log to record the delta within the change log for every instance of the attribute, the association, or the combinations thereof.

5. The method of claim 1, further comprising modifying the API based at least in part on the second configuration intent.

6. The method of claim 5, wherein:

the modification of the API comprises at least one of modification of the object within the API due to user input, modification of the object within the API due to an automatic calculation in a backend of a network controller, or combinations thereof, and the modification comprises at least one of a number of attributes and a number of associations between computing devices within the computing device.

7. The method of claim 1, further comprising translating the second configuration intent into a device model based at least in part on the delta.

8. The method of claim 7, wherein the second configuration intent is serialized as JavaScript object notation (JSON) data-interchange format including the delta for the object.

9. The method of claim 8, wherein provisioning the second configuration intent on the computing device within the computing device based at least in part on the delta, comprises:

with a plugin of a network controller, reading a change log generated based at least in part on the delta; and based at least in part on the change log:

invoking a translation method associated with the change log;

generating a first resource-facing service (RFS) object operation; and ignoring a remaining translation that does not change in at least a second RFS object operation.

10. A non-transitory computer-readable medium storing instructions that, when executed, causes a processor to perform operations, comprising:

identifying a first configuration intent of a computing device based at least in part on an execution of an application program interface (API) at a client device;

identifying a modification of an object within the first configuration intent at the client device as the first configuration intent is being modified, the modification defining a delta between the first configuration intent and a second configuration intent, wherein:

the delta comprises a size that is smaller relative to the first configuration intent and the second configuration intent, and the delta is defined by a change log identifying a type of change log item, the change log item storing the modification of the object in a base class;

receiving the delta as a payload from the client device; and provisioning the second configuration intent on the computing device within the computing device based at least in part on the delta.

11. The non-transitory computer-readable medium of claim 10, the operations further comprising automatically modifying the object based on the delta, wherein automatically modifying the object includes a further modification of the second configuration intent.

12. The non-transitory computer-readable medium of claim 10, wherein:

the change log item includes a name, a type, and a property type, the type includes a method, and the property type incudes an attribute, an association, or combinations thereof.

13. The non-transitory computer-readable medium of claim 12, the operations further comprising:

adding logic to the change log for every instance of attribute or association; and translating the second configuration intent into a device model based at least in part on the delta, wherein an intent model is serialized as JavaScript object notation (JSON) data-interchange format, including the delta for the object.

14. The non-transitory computer-readable medium of claim 13, wherein provisioning the second configuration intent on the computing device within the computing device based at least in part on the delta, comprises:

with a plugin of a network controller, reading a change log generated based on at least in part on the delta; and based at least in part on the change log:

invoking a translation method associated with the change log;

generating a first resource-facing service (RFS) object operation; and ignoring a remaining translation that does not change in at least a second RFS object operation.

15. A network controller comprising:

a processor; and a non-transitory computer-readable media storing instructions that, when executed by the processor, causes the processor to perform operations comprising:

identifying a first configuration intent of a computing device based at least in part on an execution of an application program interface (API) at a client device;

identifying a modification of an object within the first configuration intent at the client device as the first configuration intent is being modified, the modification defining a delta between the first configuration intent and a second configuration intent, wherein:

the delta comprises a size that is smaller relative to the first configuration intent and the second configuration intent, and the delta is defined by a change log identifying a type of change log item, the change log item storing the modification of the object in a base class;

receiving the delta as a payload from the client device; and provisioning the second configuration intent on the computing device within the computing device based at least in part on the delta.

16. The network controller of claim 15, wherein:

the change log item includes a name, a type, and a property type, the type includes a method, and the property type incudes an attribute, an association, or combinations thereof.

17. The network controller of claim 16, the operations further comprising adding logic to the change log for every instance of attribute or association.

18. The network controller of claim 15, the operations further comprising:

modifying the API based at least in part on the second configuration intent, wherein the modification of the API comprises modification of at least one object within the API due to user input, the modification comprising at least one of a number of attributes and a number of associations between computing devices within the computing device.

19. The network controller of claim 15, the operations further comprising translating the second configuration intent into a device model based at least in part on the delta.

20. The network controller of claim 19, wherein provisioning the second configuration intent on the computing device within the computing device based at least in part on the delta, comprises:

with a plugin, reading a change log generated based at least in part on the delta; and based at least in part on the change log:

invoking a translation method associated with the change log;

generating a first resource-facing service (RFS) object operation; and ignoring a remaining translation that does not change in at least a second RFS object operation.

* * * * *